United States Patent
Hosoda et al.

(10) Patent No.: US 11,742,491 B2
(45) Date of Patent: Aug. 29, 2023

(54) BINDER FOR SECONDARY BATTERY, ELECTRODE MIXTURE FOR SECONDARY BATTERY, ELECTRODE FOR SECONDARY BATTERY AND SECONDARY BATTERY

(71) Applicant: DAIKIN INDUSTRIES, LTD., Osaka (JP)

(72) Inventors: Kazuki Hosoda, Osaka (JP); Takahiro Kitahara, Osaka (JP); Manabu Fujisawa, Osaka (JP); Takashi Iguchi, Osaka (JP); Kazuya Asano, Osaka (JP); Chihiro Shinoda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 436 days.

(21) Appl. No.: 16/755,436

(22) PCT Filed: Oct. 2, 2018

(86) PCT No.: PCT/JP2018/036824
§ 371 (c)(1),
(2) Date: Apr. 10, 2020

(87) PCT Pub. No.: WO2019/087652
PCT Pub. Date: May 9, 2019

(65) Prior Publication Data
US 2020/0243862 A1 Jul. 30, 2020

(30) Foreign Application Priority Data

Oct. 30, 2017 (JP) .................................. 2017-209270
Feb. 23, 2018 (JP) .................................. 2018-031003

(51) Int. Cl.
| | |
|---|---|
| *H01M 4/62* | (2006.01) |
| *H01M 4/13* | (2010.01) |
| *H01M 10/05* | (2010.01) |
| *C08F 214/22* | (2006.01) |
| *C08F 214/26* | (2006.01) |
| *C08F 220/04* | (2006.01) |
| *H01M 4/131* | (2010.01) |
| *H01M 10/0525* | (2010.01) |
| *H01M 4/02* | (2006.01) |

(52) U.S. Cl.
CPC ........... *H01M 4/623* (2013.01); *C08F 214/22* (2013.01); *C08F 214/26* (2013.01); *C08F 220/04* (2013.01); *H01M 4/131* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 5,246,796 A | 9/1993 | Nagamine et al. | |
| 2015/0017532 A1 | 1/2015 | Iguchi et al. | |
| 2015/0137028 A1* | 5/2015 | Ichisaka | H01M 4/623 |
| | | | 252/182.1 |
| 2015/0137029 A1* | 5/2015 | Ichisaka | H01M 4/139 |
| | | | 252/182.1 |
| 2019/0296359 A1 | 9/2019 | Asano et al. | |

FOREIGN PATENT DOCUMENTS

| | | | | |
|---|---|---|---|---|
| EP | 3447831 | * | 2/2019 | ............. H01M 4/62 |
| EP | 3 608 992 A1 | | 2/2020 | |
| EP | 3608992 | * | 2/2020 | ............. H01M 2/16 |
| JP | 4-249859 A | | 9/1992 | |
| JP | 7-201316 A | | 8/1995 | |
| JP | 2013-219016 A | | 10/2013 | |
| WO | 2013/176093 A1 | | 11/2013 | |
| WO | WO 2016076371 | * | 2/2016 | ............. H01M 4/04 |
| WO | 2016/076371 A1 | | 5/2016 | |
| WO | 2018/066430 A1 | | 4/2018 | |

OTHER PUBLICATIONS

International Search Report for PCT/JP2018/036824 dated Dec. 18, 2018.
Extended European Search Report dated Feb. 26, 2021 from the European Patent Office in EP Application No. 18872208.6.
International Preliminary Report on Patentability with a Translation of Written Opinion in International Application No. PCT/JP2018/036824, dated May 5, 2020.

* cited by examiner

*Primary Examiner* — Maria Laios
*Assistant Examiner* — Angela J Martin
(74) *Attorney, Agent, or Firm* — Sughrue Mion, PLLC

(57) ABSTRACT

A binder for a secondary battery containing a fluorine-containing polymer (A) and polyvinylidene fluoride (B). The fluorine-containing polymer (A) contains a polymerized unit based on vinylidene fluoride, a polymerized unit based on tetrafluoroethylene, and a polymerized unit based on a monomer (2-2) represented by the following formula (2-2):

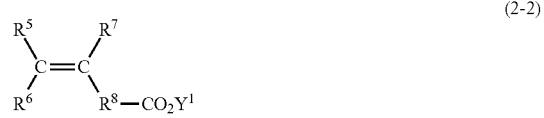

(2-2)

wherein $R^5$, $R^6$, and $R^7$ are each independently a hydrogen atom or a C1-C8 hydrocarbon group; $R^8$ is a C1-C8 hydrocarbon group; and $Y^1$ is an inorganic cation or an organic cation. Also disclosed is an electrode mixture and an electrode for a secondary battery including the binder, and a secondary battery including the electrode.

12 Claims, No Drawings

BINDER FOR SECONDARY BATTERY, ELECTRODE MIXTURE FOR SECONDARY BATTERY, ELECTRODE FOR SECONDARY BATTERY AND SECONDARY BATTERY

CROSS REFERENCE TO RELATED APPLICATIONS

This application is a National Stage of International Application No. PCT/JP2018/036824 filed Oct. 2, 2018, claiming priority based Japanese Patent Application No. 2017-209270 filed Oct. 30, 2017 and 2018-031003 filed Feb. 23, 2018.

TECHNICAL FIELD

The invention relates to binders for a secondary battery, electrode mixtures for a secondary battery, electrodes for a secondary battery, and secondary batteries.

BACKGROUND ART

Secondary batteries such as lithium ion secondary batteries have characteristics such as a high voltage, a high energy density, less self-discharge, a smaller memory effect, and a significantly light weight. Thus, secondary batteries are used for compact and easy-to-carry electrical and electronic equipment such as laptop computers, mobile phones, smart phones, tablet PCs, and ultrabooks. In addition, such secondary batteries are being put into practical use as electric power supplies for a variety of applications from vehicle power supplies for driving used in automobiles to stationary large power supplies. Secondary batteries are required to have a much higher energy density and much better battery characteristics.

For example, Patent Literature 1 aims to provide a non-aqueous electrolyte secondary battery with improved charge and discharge characteristics and discloses the following technique. Specifically, a lithium-containing oxide (e.g., $LiCoO_2$) serving as a positive electrode active material, graphite serving as a conductive agent, and polyvinylidene fluoride are mixed to provide a positive electrode mixture. This positive electrode mixture is dispersed in N-methylpyrrolidone to give slurry. The slurry is then applied to aluminum foil serving as a positive electrode current collector. Separately, a carbonaceous material serving as a negative electrode active material and polyvinylidene fluoride are mixed to provide a negative electrode mixture. This negative electrode mixture is dispersed in N-methylpyrrolidone to give slurry. The slurry is applied to copper foil serving as a negative electrode current collector. The workpieces are dried and compression-molded into an electrode sheet using a roller pressing machine.

Patent Literature 2 discloses the following binder containing a fluorine-containing polymer in order to provide a binder that can, even when used in a reduced amount, well maintain a powdery electrode material, have excellent adhesiveness to a current collector substrate, and give flexibility to an electrode even when the electrode is applied in a great thickness, rolled, and pressed for high density. The fluorine-containing polymer contains a polymerized unit based on vinylidene fluoride and a polymerized unit based on a monomer that has an amide group (—CO—NRR', wherein R and R' are the same as or different from each other and are each a hydrogen atom or an alkyl group optionally containing a substituent) or an amide bond (—CO—NR"—, wherein R" is a hydrogen atom, an alkyl group optionally containing a substituent, or a phenyl group optionally containing a substituent). The binder has a solution viscosity of 10 to 20000 mPa—s.

Patent Literature 3 discloses the following electrode mixture containing a powdery electrode material, a binder, and an organic solvent in order to provide an electrode mixture that can provide an electrode having a small viscosity change, a high electrode density, and excellent flexibility, and enabling a battery having excellent electric characteristics. The binder contains a fluorine-containing polymer that contains a polymerized unit based on vinylidene fluoride and a polymerized unit based on tetrafluoroethylene, and polyvinylidene fluoride. The fluorine-containing polymer contains the polymerized unit based on vinylidene fluoride in an amount of 80.0 to 90.0 mol % relative to all polymerized units and the polyvinylidene fluoride has a number average molecular weight of 150000 to 1400000.

CITATION LIST

Patent Literature

Patent Literature 1: JP H04-249859 A
Patent Literature 2: JP 2013-219016 A
Patent Literature 3: WO 2013/176093

SUMMARY OF INVENTION

Technical Problem

The invention aims to provide a binder and an electrode mixture for a secondary battery leading to an excellently high density of an electrode, excellent adhesiveness to a current collector, excellent flexibility of an electrode, and excellent viscosity retention of slurry.

Solution to Problem

The invention relates to a binder for a secondary battery, containing a fluorine-containing polymer (A); and polyvinylidene fluoride (B), the fluorine-containing polymer (A) containing: a polymerized unit based on vinylidene fluoride; a polymerized unit based on tetrafluoroethylene; and a polymerized unit based on a monomer (2-2) represented by the following formula (2-2):

[Chem. 1]

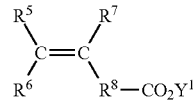

wherein $R^5$, $R^6$, and $R^7$ are each independently a hydrogen atom or a C1-C8 hydrocarbon group; $R^8$ is a C1-C8 hydrocarbon group; and $Y^1$ is an inorganic cation or an organic cation.

The fluorine-containing polymer (A) and the polyvinylidene fluoride (B) preferably give a mass ratio (A)/(B) of 5/95 to 95/5.

The fluorine-containing polymer (A) preferably contains the polymerized unit based on vinylidene fluoride in an amount of 50 to 95 mol %, the polymerized unit based on tetrafluoroethylene in an amount of 4.8 to 49.95 mol %, and the polymerized unit based on the monomer (2-2) in an amount of 0.05 to 2.0 mol %, relative to all polymerized units.

The fluorine-containing polymer (A) preferably has a weight average molecular weight of 200000 to 2400000.

The fluorine-containing polymer (A) preferably has a storage elastic modulus of 1000 MPa or lower at 25° C.

The invention also relates to an electrode mixture for a secondary battery, containing a mixture that contains at least: the above binder for a secondary battery; a powdery electrode material for a battery; and water or a nonaqueous solvent.

The invention also relates to an electrode for a secondary battery, containing the above binder for a secondary battery.

The invention also relates to a secondary battery containing the above electrode for a secondary battery.

Advantageous Effects of Invention

The binder of the invention has the above structure, and thus leads to an excellently high density of an electrode, excellent adhesiveness to a current collector, excellent flexibility of an electrode, and excellent viscosity retention of slurry.

The electrode mixture of the invention has the above structure, and thus can form an electrode material layer leading to an excellently high density of an electrode, excellent adhesiveness to a current collector, excellent flexibility of an electrode, and excellent viscosity retention of slurry.

DESCRIPTION OF EMBODIMENTS

The invention will be specifically described hereinbelow.

A technique for producing an electrode is a significant point for improvement of the energy density of a secondary battery. For example, in the case of electrodes of a lithium ion secondary battery, the negative electrode may be produced from a carbonaceous material such as coke or carbon as a negative electrode active material. In this case, commonly, the carbonaceous material is powdered and dispersed together with a binder and a thickener in a solvent so that a negative electrode mixture is prepared. The negative electrode mixture is applied to a negative electrode current collector and the workpiece is dried so that the solvent is removed. The workpiece is then rolled, whereby the negative electrode may be produced. The positive electrode may be produced as follows, for example. Specifically, a lithium-containing oxide as a positive electrode active material is powdered and dispersed together with a conducting agent and a binder in a solvent so that a positive electrode mixture is prepared. The positive electrode mixture is applied to a positive electrode current collector and the workpiece is dried so that the solvent is removed. The workpiece is then rolled, whereby the positive electrode may be produced.

For example, currently major positive electrode mixture films for lithium ion secondary batteries to be used in electric vehicles have a density of 3.4 to 3.6 g/cc. In order to achieve a higher energy density, positive electrode mixture films having a much higher density are awaited.

The binder of the invention contains a fluorine-containing polymer (A) and polyvinylidene fluoride (PVdF) (B). This feature leads to an excellently high density of an electrode, and thus the binder of the invention is expected to give a much higher capacity to a battery. Further, the binder of the invention leads to excellent adhesiveness to a current collector, excellent flexibility of an electrode, and excellent viscosity retention of slurry.

Binders themselves hardly contribute to the electrochemical performance of an electrode, and the amount thereof is therefore preferably as small as possible in order to lead to a high density of an electrode and a lower internal resistance of an electrode. Since the binder of the invention has excellent adhesiveness to a current collector, the amount thereof can be reduced. This can lead to an improved battery capacity and reduced resistance of an electrode, resulting in improved battery performance. Additionally, as the amount of the binder is reduced, the production cost can also be reduced.

Since an electrode sheet containing the binder of the invention has excellent flexibility, it can easily be densified during rolling of a positive electrode mixture film. Lithium ion secondary batteries, to which the electrode sheet is typically applied, are in the form of cylinder, square, laminate, or the like. The electrode sheet is rolled or pressed before introduced into a battery. In these steps, the electrode sheet may easily crack, cause falling of a powdery electrode material, or separate from a current collector. In contrast, the binder of the invention has excellent adhesiveness to a current collector and excellent flexibility, and thus the electrode does not crack, does not cause falling of the powdery electrode material, and does not separate from the current collector even when the electrode material is applied thickly and then rolled or pressed so as to achieve densification.

Further, in order to increase the capacity of lithium ion secondary batteries, an increased amount of nickel is used in an active material. This unfortunately causes alkaline conditions in formation of an electrode mixture, resulting in gelling of the electrode mixture. This makes it difficult to apply the electrode mixture to a current collector. In contrast, the binder of the invention leads to excellent viscosity retention of slurry even when containing a nickel-rich active material, and thus the electrode mixture produced is not gelatinized and maintains the fluidity even after long-term storage.

Electrode unevenness may easily occur when a polymer used in the binder has poor slurry dispersibility. The binder of the invention leads to excellent viscosity retention of slurry and therefore the electrode mixture prepared can have good slurry dispersibility even after long-term storage. Accordingly, the binder of the invention causes less electrode unevenness and is expected to lead to excellent rate characteristics.

The fluorine-containing polymer (A) contains a polymerized unit based on vinylidene fluoride, a polymerized unit based on tetrafluoroethylene, and a polymerized unit based on a monomer (2-2) represented by the formula (2-2) to be described later.

The fluorine-containing polymer (A) contains a polymerized unit based on the monomer (2-2). The monomer (2-2) contains a specific functional group, which can lead to improved adhesiveness to a current collector in combination use with the PVdF (B).

For example, the binder of the invention can have improved adhesiveness to a current collector in comparison with the case of using a fluorine-containing polymer containing a polymerized unit based on VdF and a polymerized unit based on TFE and free from a polymerized unit based on the monomer (2-2), as disclosed in Patent Literature documents 2 and 3. Accordingly, the binder of the invention enables reduction in amount of the binder and a much higher capacity of a battery.

The binder of the invention can lead to not only improved adhesiveness to a current collector but also, surprisingly, excellent gelling resistance and excellent slurry dispersibility, as well as improved flexibility of the resulting electrode.

The monomer (2-2) is a monomer represented by the following formula (2-2). One monomer (2-2) or two or more monomers (2-2) may be used.

[Chem. 2]

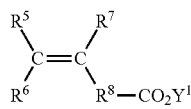

(2-2)

In the formula, $R^5$, $R^6$, and $R^7$ are each independently a hydrogen atom or a C1-C8 hydrocarbon group; $R^8$ is a C1-C8 hydrocarbon group; and $Y^1$ is an inorganic cation or an organic cation.

In the formula (2-2), $Y^1$ is an inorganic cation or an organic cation. Examples of the inorganic cation include cations such as H, Li, Na, K, Mg, Ca, Al, and Fe. Examples of the organic cation include cations such as $NH_4$, $NH_3R^x$, $NH_2R^x{}_2$, $NHR^x{}_3$, and $NR^x{}_4$ (wherein $R^x$s are each independently a C1-C4 alkyl group). $Y^1$ is preferably H, Li, Na, K, Mg, Ca, Al, or $NH_4$, more preferably H, Li, Na, K, Mg, Al, or $NH_4$, still more preferably H, Li, Al, or $NH_4$, particularly preferably H. These specific examples of the inorganic and organic cations are mentioned without the signs and valences for convenience.

In the formula (2-2), $R^5$, $R^6$, and $R^7$ are each independently a hydrogen atom or a C1-C8 hydrocarbon group. The hydrocarbon group is a monovalent hydrocarbon group. The hydrocarbon group preferably has a carbon number of 4 or smaller. Examples of the hydrocarbon group include alkyl groups, alkenyl groups, and alkynyl groups of the above carbon number, and preferred examples thereof include a methyl group and an ethyl group. $R^5$ and $R^6$ are each independently preferably a hydrogen atom, a methyl group, or an ethyl group, and $R^7$ is preferably a hydrogen atom or a methyl group.

In the formula (2-2), $R^8$ is a C1-C8 hydrocarbon group. The hydrocarbon group is a divalent hydrocarbon group. The hydrocarbon group preferably has a carbon number of 4 or smaller. Examples of the hydrocarbon group include alkylene groups and alkenylene groups of the above carbon number, and preferred examples thereof include a methylene group, an ethylene group, an ethylidene group, a propylidene group, and an isopropylidene group. A methylene group is more preferred.

The monomer (2-2) preferably includes at least one selected from the group consisting of vinylacetic acid (3-butenoic acid) and salts thereof, 3-pentenoic acid and salts thereof, 4-pentenoic acid and salts thereof, 3-hexenoic acid and salts thereof, 4-hexenoic acid and salts thereof, and 5-hexenoic acid and salts thereof, particularly preferably at least one selected from the group consisting of 3-butenoic acid and salts thereof and 4-pentenoic acid and salts thereof.

In the fluorine-containing polymer (A), the polymerized unit based on the monomer (2-2) is preferably present in an amount of 0.05 to 2.0 mol % relative to all polymerized units. This polymerized unit in an amount within the above range can lead to improved adhesiveness of the binder to a current collector without impairing the characteristics owing to vinylidene fluoride and tetrafluoroethylene. The amount of the polymerized unit is more preferably 0.10 mol % or more, still more preferably 0.30 mol % or more, further more preferably 0.40 mol % or more, while more preferably 1.5 mol % or less.

The fluorine-containing polymer (A) contains a polymerized unit based on vinylidene fluoride. This allows the binder to have excellent solvent solubility, oxidation resistance, and electrolyte solution erosion resistance.

The fluorine-containing polymer (A) contains a polymerized unit based on tetrafluoroethylene. This allows the binder to have excellent flexibility. This also leads to improved chemical resistance (especially alkali resistance).

In the fluorine-containing polymer (A), preferably, the polymerized unit based on vinylidene fluoride is present in an amount of 50 to 95 mol % relative to all polymerized units and the polymerized unit based on tetrafluoroethylene is present in an amount of 4.8 to 49.95 mol % relative to all polymerized units. This can lead to improved flexibility and chemical resistance of the resulting electrode without impairing the characteristics owing to the other polymerized units. The amount of the polymerized unit based on vinylidene fluoride is more preferably 60 to 90 mol %, and the amount of the polymerized unit based on tetrafluoroethylene is more preferably 9.8 to 39.95 mol %.

The upper limit of the amount of the polymerized unit based on vinylidene fluoride may be 94 mol % or may be 89 mol %.

The upper limit of the amount of the polymerized unit based on tetrafluoroethylene may be 49.90 mol %, 49.70 mol %, 49.60 mol %, 49 mol %, 39.90 mol %, 39.70 mol %, 39.60 mol %, or 39.00 mol %.

As long as the fluorine-containing polymer (A) contains the polymerized unit based on vinylidene fluoride, the polymerized unit based on tetrafluoroethylene, and the polymerized unit based on the monomer (2-2), it may further contain a polymerized unit based on a different monomer copolymerizable with these monomers.

Examples of the different monomer to be used include vinyl fluoride, trifluoroethylene, chlorotrifluoroethylene, fluoroalkyl vinyl ether, hexafluoropropylene, 2,3,3,3-tetrafluoropropene, propylene, and trans-1,3,3,3-tetrafluoropropene. In terms of flexibility and chemical resistance, hexafluoropropylene and 2,3,3,3-tetrafluoropropene are particularly preferred.

In the case of using any of these monomers, the amount of the polymerized unit based on the monomer(s) is preferably 0.1 to 50 mol % relative to all polymerized units.

The fluorine-containing polymer (A) preferably has a weight average molecular weight (polystyrene equivalent) of 200000 to 2400000, more preferably 400000 to 2200000, still more preferably 600000 to 2000000.

The weight average molecular weight can be determined by gel permeation chromatography (GPC) using N,N-dimethylformamide as a solvent at 50° C.

In order to improve the battery characteristics, the fluorine-containing polymer (A) preferably has a number average molecular weight (polystyrene equivalent) of 70000 to 1200000. The number average molecular weight is more preferably 140000 to 1100000.

The number average molecular weight can be determined by gel permeation chromatography (GPC) using N,N-dimethylformamide as a solvent at 50° C.

The fluorine-containing polymer (A) preferably has a storage elastic modulus of 1000 MPa or lower at 25° C. The fluorine-containing polymer having a storage elastic modulus of 1000 MPa or lower at 25° C. can lead to furthermore improved flexibility of the binder. The storage elastic modulus is more preferably 800 MPa or lower, still more preferably 600 MPa or lower. The storage elastic modulus is also preferably 100 MPa or higher, more preferably 200 MPa or higher, still more preferably 250 MPa or higher.

The fluorine-containing polymer (A) preferably has a storage elastic modulus of 200 MPa or lower at 100° C. The fluorine-containing polymer having a storage elastic modulus of 200 MPa or lower at 100° C. can lead to furthermore improved flexibility of the binder. The storage elastic modulus is more preferably 160 MPa or lower, still more preferably 140 MPa or lower, further more preferably 110 MPa or lower. The storage elastic modulus is also preferably 1 MPa or higher, more preferably 5 MPa or higher, still more preferably 10 MPa or higher.

The storage elastic modulus is a value at 25° C. and at 100° C. measured for a sample having a length of 30 mm, a width of 5 mm, and a thickness of 40 μm using a dynamic viscoelasticity analyzer DVA220 (available from IT Keisoku Seigyo K. K.) by dynamic mechanical analysis in a tensile mode, at a grip width of 20 mm, a measurement temperature of −30° C. to 160° C., a temperature-increasing rate of 2° C./min, and a frequency of 1 Hz.

The measurement sample can be prepared by, for example, weighing a binder (fluorine-containing polymer (A)) and dissolving it in N-methyl-2-pyrrolidone (NMP) such that the concentration is 8% by mass, thereby providing a binder solution; casting the solution on a glass plate and drying it at 100° C. for 12 hours, then at 100° C. for 12 hours in vacuo; and cutting the resulting film having a thickness of 40 μm into a length of 30 mm and a width of 5 mm.

The fluorine-containing polymer (A), when having a low storage elastic modulus as described above, can easily lead to an increased density of the positive electrode mixture film containing the binder of the invention during rolling. Further, in this case, the electrode containing the binder of the invention does not suffer from cracking even when the electrode is thickly applied and densified and the resulting film is rolled.

Copolymerization of vinylidene fluoride, tetrafluoroethylene, the monomer (2-2), and optionally a different monomer copolymerizable with these monomers may be performed by any technique such as suspension polymerization, emulsion polymerization, or solution polymerization. In consideration of easy aftertreatment, aqueous suspension polymerization or emulsion polymerization is preferred.

In the above copolymerization, a polymerization initiator, a surfactant, a chain-transfer agent, and a solvent may be used, and each of these may be any conventionally known one. The polymerization initiator may be an oil-soluble radical polymerization initiator or a water-soluble radical polymerization initiator.

The oil-soluble radical polymerization initiator may be a known oil-soluble peroxide, and typical examples thereof include dialkyl peroxycarbonates such as diisopropyl peroxydicarbonate, di-n-propyl peroxydicarbonate, and di-sec-butyl peroxydicarbonate; peroxyesters such as t-butyl peroxyisobutyrate and t-butyl peroxypivalate; dialkyl peroxides such as di-t-butyl peroxide; and di(perfluoro (or fluorochloro) acyl]peroxides such as di(ω-hydro-dodecafluoroheptanoyl)peroxide, di(ω-hydro-tetradecafluoroheptanoyl) peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl)peroxide, di(tetrachloroundecafluorooctanoyl)peroxide, di(pentachlorotetradecafluorodecanoyl)peroxide, and di(undecachlorodotriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleates, and t-butyl hydroperoxides. Any reducing agent such as a sulfite or a sulfurous acid salt may be used in combination with a peroxide, and the amount thereof may be 0.1 to 20 times the amount of the peroxide.

The surfactant may be a known surfactant, and examples thereof include nonionic surfactants, anionic surfactants, and cationic surfactants. Preferred are fluorine-containing anionic surfactants, and more preferred are C4-C20 linear or branched fluorine-containing anionic surfactants which may optionally contain an ether bond (i.e., an oxygen atom may be present between carbon atoms). The amount thereof (relative to the water as a polymerization medium) is preferably 50 to 5000 ppm.

Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is typically 0.01 to 20% by mass relative to the polymerization solvent.

Examples of the solvent include water and solvent mixtures of water and an alcohol.

In the suspension polymerization, a fluorosolvent may be used in addition to water. Examples of the fluorosolvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$; hydrofluorocarbons such as $CF_2HCF_2CF_2CF_2H$, $CF_3CFHCF_2CF_2CF_3$, $CF_3CF_2CF_2CF_2H$, $CF_3CF_2CFHCF_2CF_3$, $CF_3CFHCFHCF_2CF_3$, $CF_2HCF_2CF_2CF_2CF_2H$, $CF_2HCFHCF_2CF_2CF_3$, $CF_3CF_2CF_2CF_2CF_2H$, $CF_3CH(CF_3)CF_3CF_2CF_3$, $CF_3CF(CF_3)CFHCF_2CF_3$, $CF_3CF(CF_3)CFHCFHCF_3$, $CF_3CH(CF_3)CFHCF_2CF_3$, $CF_2HCF_2CF_2CF_2CF_2CF_2H$, $CF_3CF_2CF_2CH_2CH_3$, and $CF_3CH_2CF_2CH_3$; (perfluoroalkyl) alkyl ethers such as $F(CF_2)_4OCH_3$, $F(CF_2)_4OC_2H_5$, $(CF_3)_2CFOCH_3$, and $F(CF_2)_3OCH_3$; and hydrofluoroalkyl ethers such as $CF_3CH_2OCF_2CHF_2$, $CHF_2CF_2CH_2OCF_2CHF_2$, and $CF_3CF_2CH_2OCF_2CHF_2$. Preferred are perfluoroalkanes. In terms of suspension performance and economic efficiency, the amount of the fluorosolvent is preferably 10 to 100% by mass relative to the aqueous medium.

The polymerization temperature may be, but is not limited to, 0° C. to 100° C. The polymerization pressure is appropriately set in accordance with other polymerization conditions such as the type, amount, and vapor pressure of a solvent used, and the polymerization temperature. It may typically be 0 to 9.8 MPaG.

In the case of suspension polymerization using water as a dispersion medium, a suspension agent such as methyl cellulose, methoxylated methyl cellulose, propoxylated methyl cellulose, hydroxyethyl cellulose, hydroxypropyl cellulose, polyvinyl alcohol, polyethylene oxide, or gelatin may be used in an amount of 0.005 to 1.0% by mass, preferably 0.01 to 0.4% by mass, relative to the water.

Examples of the polymerization initiator to be used in this case include diisopropyl peroxydicarbonate, di-normal-propyl peroxydicarbonate, di-normal-heptafluoropropyl peroxydicarbonate, isobutyryl peroxide, di(chlorofluoroacyl) peroxide, and di(perfluoroacyl)peroxide. The amount thereof is preferably 0.1 to 5% by mass relative to the sum of the amounts of the monomers (the sum of the amounts of vinylidene fluoride, tetrafluoroethylene, the monomer (2-2), and optionally a different monomer copolymerizable with these monomers).

Further, the polymerization degree of the polymer to be obtained can be controlled by adding a chain-transfer agent such as ethyl acetate, methyl acetate, acetone, methanol, ethanol, n-propanol, acetaldehyde, propylaldehyde, ethyl propionate, or carbon tetrachloride. The amount thereof is typically 0.1 to 5% by mass, preferably 0.5 to 3% by mass, relative to the sum of the amounts of the monomers.

The sum of the amounts of the monomers expressed by the ratio by weight of (sum of amounts of monomers): (water) is 1:1 to 1:10, preferably 1:2 to 1:5. The polymerization is performed at a temperature of 10° C. to 50° C. for 10 to 100 hours.

The aforementioned suspension polymerization enables easy copolymerization of vinylidene fluoride, tetrafluoroethylene, the monomer (2-2), and optionally a different monomer.

The emulsion polymerization is performed in the presence of an aqueous medium. The aqueous medium is preferably water. The water used in the polymerization is preferably deionized water, and the electrical conductivity thereof is 10 µS/cm or lower and is preferably as low as possible. If there are many ions, the reaction rate may be unstable. Also, the fluorosolvent preferably contains minimum amounts of components such as compounds containing an acid and a chlorine group introduced during production, i.e., has a purity as high as possible. Such compounds containing an acid and chlorine may chain transfer. Thus, to minimize the amounts of such compounds is preferred so as to stabilize the polymerization rate and the molecular weight. In addition, other materials to be used in the polymerization (e.g., monomers such as vinylidene fluoride and tetrafluoroethylene, initiator, chain-transfer agent) are also preferably those having high purity containing small amounts of chain-transfer components. In order to stabilize the reaction rate and to control the molecular weight, a preparatory stage for the reaction is preferably performed as follows. Specifically, a container is charged with water and subjected to an air-tight test under stirring, and then the pressure inside the container is reduced, slightly increased with nitrogen, and reduced repeatedly. The oxygen concentration in the container is then checked whether it is reduced to as low as 1000 ppm or lower, and again the pressure is reduced and materials such as the monomers are fed, so that the reaction is initiated.

In the emulsion polymerization, the polymerization temperature may be, but is not limited to, 0° C. to 150° C. The polymerization pressure is appropriately set in accordance with other polymerization conditions such as the polymerization temperature, and may typically be 0 to 9.8 MPaG.

In the emulsion polymerization, one or more surfactants may be used. The surfactant may be any known emulsifier, and examples thereof include the following surfactant groups [A] to [G].

(Surfactant group [A])

Fluorine-containing anionic alkyl surfactants such as $CF_3(CF_2)_4COONH_4$, $CF_3(CF_2)_3COONH_4$, $CF_3(CF_2)_2COONH_4$, $CF_3(CF_2)_3SO_3Na$, and $CF_3(CF_2)_3SO_2NH_2$ (Surfactant group [B])

Fluorine-containing anionic alkyl ether surfactants represented by the formula: $CF_3O-CF(CF_3)CF_2O-CX^a(CF_3)-Y^a$ (wherein $X^a$ is H or F; and $Y^a$ is $-COOM^1$, $-SO_3M^2$, $-SO_2NM^3M^4$, or $-PO_3M^5M^6$, where $M^1$, $M^2$, $M^3$, $M^4$, $M^5$, and $M^6$ are the same as or different from each other, and are each H, $NH_4$, or a monovalent cation); those represented by the formula: $CF_3O-CF_2CF_2CF_2O-CFX^a CF_2-Y^a$ (wherein $X^a$ is H or F; and $Y^a$ is defined in the same manner as above); and those represented by the formula: $CF_3CF_2O-CF_2CF_2O-CFX^a-Y^a$ (wherein $X^a$ is H or F; and $Y^a$ is defined in the same manner as above)

(Surfactant group [C])

Fluorine-containing allyl ethers such as $CH_2=CFCF_2-O-(CF(CF_3)CF_2O)-CF(CF_3)-COONH_4$ (Surfactant group [D])

Non-fluorinated surfactants, including alkanesulfonic acids such as linear 1-octanesulfonic acid, linear 2-octanesulfonic acid, linear 1,2-octanedisulfonic acid, linear 1-decanesulfonic acid, linear 2-decanesulfonic acid, linear 1,2-decanedisulfonic acid, linear 1,2-dodecanedisulfonic acid, linear 1-dodecanesulfonic acid, linear 2-dodecanesulfonic acid, and linear 1,2-dodecanedisulfonic acid, and salts thereof; alkyl sulfates such as 1-octylsulfate, 2-octylsulfate, 1,2-octyldisulfate, 1-decylsulfate, 2-decylsulfate, 1,2-decyldisulfate, 1-dodecylsulfate, 2-dodecylsulfate, and 1,2-dodecyl disulfate, and salts thereof; polyvinylphosphonic acid and salts thereof; polyacrylic acid and salts thereof; and polyvinylsulfonic acid and salts thereof (Surfactant group [E])

Non-fluorine ether surfactants such as polyethylene glycol acrylate, polyethylene glycol, polyethylene glycol phenol oxide, polypropylene glycol acrylate, and polypropylene glycol (Surfactant group [F])

Mixtures of at least one surfactant selected from the group consisting of non-fluorine surfactants (e.g., at least one selected from the surfactant group [D]) and fluorine-containing surfactants having a molecular weight of less than 400, and a functional fluoropolyether (a compound containing a fluoropolyoxyalkylene chain (e.g., a chain containing at least one repeating unit represented by the formula: $-(CF_2)_j-CFZ^eO-$ (wherein $Z^e$ is F or a C1-C5 (per)fluoro(oxy)alkyl group; and j is an integer of 0 to 3)) and a functional group (e.g., at least one selected from the group consisting of a carboxylic acid group, a phosphonic acid group, a sulfonic acid group, and acid-salt-type groups thereof))

(Surfactant group [G])

Inactivated non-fluorine surfactants (e.g., products obtained by reacting a hydrocarbon-containing surfactant such as sodium dodecylsulfate, linear sodium alkylpolyether sulfonate, or a siloxane surfactant with hydrogen peroxide or a polymerization initiator to be described later).

The amount of the surfactant is preferably 1 to 50000 ppm of the aqueous medium.

The polymerization initiator for the emulsion polymerization may be an oil-soluble radical polymerization initiator or a water-soluble radical polymerization initiator, and is preferably a water-soluble radical polymerization initiator.

The oil-soluble radical polymerization initiator may be a known oil-soluble peroxide, and typical examples thereof include dialkyl peroxycarbonates such as diisopropyl peroxydicarbonate, di-n-propyl peroxydicarbonate, and di-sec-butyl peroxydicarbonate; peroxyesters such as t-butyl peroxyisobutyrate and t-butyl peroxypivalate; dialkyl peroxides such as di-t-butyl peroxide; and di(perfluoro (or fluorochloro) acyl]peroxides such as di(co-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluoro-hexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorotriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleates, and t-butyl hydroperoxides. Any reducing agent such as a sulfite or a sulfurous acid salt may be used in combination with a peroxide, and the amount thereof may be 0.1 to 20 times the amount of the peroxide.

The polymerization initiator for the emulsion polymerization is more preferably a persulfate. The amount thereof is 0.001 to 20% by mass relative to the aqueous medium.

In the emulsion polymerization, a chain-transfer agent may be used. Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is 0.001 to 20% by mass relative to the aqueous medium.

In the case of powdering the latex obtained by the emulsion polymerization, this powdering may be achieved by any method, including conventionally known methods. Examples thereof include coagulation by adding an acid, coagulation by adding an inorganic metal salt, coagulation by adding an organic solvent, and freezing coagulation. The coagulating agent for acid coagulation may be any known coagulating agent, such as hydrochloric acid, sulfuric acid, or nitric acid. The coagulating agent for salt coagulation may be any known coagulating agent, such as sodium sulfate, magnesium sulfate, or aluminum sulfate. The coagulation may be followed by washing with water or an organic solvent to remove residual components such as a surfactant, a polymerization initiator, a chain-transfer agent, and an excessive coagulating agent. The wet polymer is then dried, whereby dry powder is obtained.

The aforementioned emulsion polymerization enables easy copolymerization of vinylidene fluoride, tetrafluoroethylene, the monomer (2-2), and optionally a different monomer.

The amounts of monomers to be copolymerized with vinylidene fluoride and tetrafluoroethylene (i.e., the monomer (2-2) and an optional different monomer) are decided in consideration of the properties of the resulting copolymer, such as the adhesiveness, chemical resistance, molecular weight, and polymerization yield.

The binder further contains PVdF (B). The invention is based on the findings that combination use of PVdF (B) with the fluorine-containing polymer (A) as a binder can reduce a viscosity change even after 24 hours from the preparation of the mixture and can provide an electrode having excellent gelling resistance, a high electrode density, excellent adhesiveness to a current collector, and excellent flexibility.

The PVdF may be a homopolymer consisting of a polymerized unit based on VdF, or may be a polymer containing a polymerized unit based on VdF and a polymerized unit based on a monomer (a) copolymerizable with the polymerized unit based on VdF.

Examples of the monomer (a) include tetrafluoroethylene, vinyl fluoride, trifluoroethylene, chlorotrifluoroethylene, fluoroalkyl vinyl ether, hexafluoropropylene, 2,3,3,3-tetrafluoropropene, propylene, and trans-1,3,3,3-tetrafluoropropene.

(Meth)acrylic monomers such as acrylic acid (preferably, hydrophilic (meth)acrylic monomers) may also be used.

Examples thereof also include unsaturated dibasic acid monoesters as disclosed in JP H06-172452 A, such as monomethyl maleate, monomethyl citraconate, monoethyl citraconate, and vinylene carbonate; compounds containing a hydrophilic polar group, e.g., —$SO_3M$, —$OSO_3M$, —COOM, —$OPO_3M$ (wherein M is an alkali metal), or an amine polar group represented by —$NHR^1$ or —$NR^2R^3$ (wherein $R_1$, $R^2$, and $R^3$ are alkyl groups) as disclosed in JP H07-201316 A, such as $CH_2$=CH—$CH_2$—Y, $CH_2$=C($CH_3$)—$CH_2$—Y, $CH_2$=CH—$CH_2$—O—CO—CH($CH_2COOR^4$)—Y, $CH_2$=CH—$CH_2$—O—$CH_2$—CH(OH)—$CH_2$—Y, $CH_2$=C($CH_3$)—CO—O—$CH_2$—$CH_2$—$CH_2$—Y, $CH_2$=CH—CO—O—$CH_2$—$CH_2$—Y, and $CH_2$=CHCO—NH—C($CH_3$)$_2$—$CH_2$—Y (wherein Y is a hydrophilic polar group; and $R^4$ is an alkyl group); and maleic acid and maleic anhydride. Examples of the copolymerizable monomer to be used also include hydroxylated allyl ether monomers such as $CH_2$=CH—$CH_2$—O—$(CH_2)_n$—OH(3≤n≤8),

[Chem. 3]

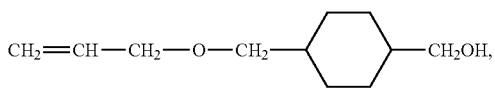

$CH_2$=CH—$CH_2$—O—$(CH_2$—$CH_2$—O$)_n$—H(1≤n≤14), and $CH_2$=CH—$CH_2$—O—$(CH_2$—CH($CH_3$)—O$)_n$—H (1≤n≤14); and allyl ether or ester monomers carboxylated and/or substituted with —$(CF_2)_n$—$CF_3$ (3≤n≤8), such as $CH_2$=CH—$CH_2$—O—CO—$C_2H_4$—COOH, $CH_2$=CH—$CH_2$—O—CO—$C_5H_{10}$—COOH, $CH_2$=CH—$CH_2$—O—$C_2H_4$—$(CF_2)_nCF_3$, $CH_2$=CH—$CH_2$—CO—O—$C_2H_4$—$(CF_2)_nCF_3$, and $CH_2$=C($CH_3$)—CO—O—$CH_2$—$CF_3$.

Studies up to now enable analogical inference that those other than the compounds containing a polar group as described above can lead to improved adhesiveness to a current collector made of foil of metal such as aluminum or copper by slightly reducing the crystallinity of PVdF to give flexibility to the material. This makes it possible to use any of unsaturated hydrocarbon monomers ($CH_2=CHR$, wherein R is a hydrogen atom, an alkyl group, or a halogen such as Cl) such as ethylene and propylene, and fluorine-based monomers such as ethylene chloride trifluoride, hexafluoropropylene, hexafluoroisobutene, $CF_2=CF-O-C_nF_{2n+1}$ (wherein n is an integer of 1 or greater), $CH_2=CF-C_nF_{2n+1}$ (wherein n is an integer of 1 or greater), $CH_2=CF-(CF_2CF_2)_nH$ (wherein n is an integer of 1 or greater), and $CF_2=CF-O-(CF_2CF(CF_3)O)_m-C_nF_{2n+1}$ (wherein m and n are each an integer of 1 or greater).

Also used is a fluorine-containing ethylenic monomer containing at least one functional group represented by the following formula (1):

[Chem 4.]

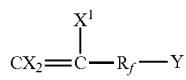
(1)

(wherein Y is $-CH_2OH$, $-COOH$, a carboxylic acid salt, a carboxy ester group, or an epoxy group; X and $X^1$ are the same as or different from each other and are each a hydrogen atom or a fluorine atom; and $R_f$ is a C1-C40 divalent fluorine-containing alkylene group or a C1-C40 divalent fluorine-containing alkylene group containing an ether bond). One or two or more of these monomers may be copolymerized to lead to much improved adhesiveness to a current collector, to prevent peeling of an electrode active material from the current collector even after repeated charge and discharge, and to lead to good charge and discharge cycle characteristics.

The PVdF (B) is preferably free from a polymerized unit based on the monomer (2-2).

The PVdF (B) also preferably contains a polymerized unit based on a hydrophilic (meth)acrylic monomer (MA) as a monomer (α). The PVdF (B) may contain one or two or more hydrophilic (meth)acrylic monomers.

The hydrophilic (meth)acrylic monomer is preferably a monomer represented by the following formula:

[Chem. 5]

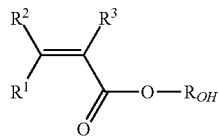

wherein $R^1$, $R^2$, and $R^3$ are the same as or different from each other, and are each a hydrogen atom or a C1-C3 hydrocarbon group; and $R_{OH}$ is a hydrogen atom or a C1-C5 divalent hydrocarbon group containing at least one hydroxy group.

Examples of the hydrophilic (meth)acrylic monomer include, but are not limited to, acrylic acid, methacrylic acid, hydroxyethyl (meth)acrylate, hydroxypropyl (meth) acrylate, and hydroxyethylhexyl (meth) acrylate.

The hydrophilic (meth)acrylic monomer preferably includes at least one selected from the group consisting of:

hydroxyethyl acrylate represented by the following formula:

[Chem. 6]

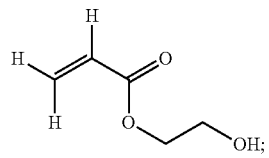
(a1)

2-hydroxypropyl acrylate represented by the following formula:

[Chem. 7]

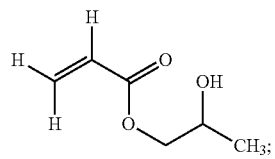
(a2)

2-hydroxypropyl acrylate represented by the following formula:

[Chem. 8]

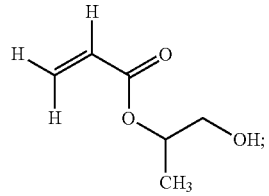
(a3)

and acrylic acid represented by the following formula:

[Chem. 9]

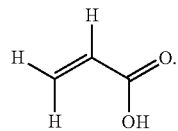
(a4)

These acrylates and acrylic acid may be used alone, or two or more thereof may be used in combination.

The hydrophilic (meth)acrylic monomer most preferably includes at least one selected from the group consisting of 2-hydroxypropyl acrylate represented by the formula (a2), 2-hydroxypropyl acrylate represented by the formula (a3), and acrylic acid represented by the formula (a4).

In terms of adhesiveness to a current collector, hydrophilicity, and heat resistance, the PVdF (B), when containing a unit (MA) based on the hydrophilic (meth)acrylic monomer (MA) as a monomer (α), preferably has a proportion of randomly distributed units (MA) of 40% or higher in the PVdF (B). The proportion is more preferably 50% or higher, still more preferably 60% or higher, particularly preferably 70% or higher.

The "proportion of the randomly distributed units (MA)" means the percentage ratio of the average number (%) of (MA) arrangements present between two polymerized units derived from VdF to the average total number (%) of (MA) units calculated by the following formula.

$$\text{Proportion of randomly distributed units } (MA) = \frac{\text{Average number (\%) of } (MA) \text{ arrangements}}{\text{Average total number (\%) of } (MA) \text{ units}} \times 100 \quad [\text{Math. 1}]$$

When every (MA) unit is isolated, i.e., present between two polymerized units of VdF, the average number of (MA) arrangements is equal to the average total number of (MA) units. Thus, the proportion of the randomly distributed units (MA) is 100%, which corresponds to the completely random distribution of the (MA) units. Therefore, the greater the number of isolated (MA) units relative to the total number of (MA) units is, the higher the aforementioned percent proportion of the randomly distributed units (MA) is.

The average total number of (MA) units in the PVdF (B) can be determined by any appropriate method. Specific examples thereof include acid-base titration that is suitable for measurement of acrylic acid content, NMR that is suitable for quantification of (MA) monomers (e.g., HPA or HEA) containing aliphatic hydrogen in a side chain, and weight balance between all (MA) monomers supplied during production of the PVdF (B) and the unreacted, residual (MA) monomers. The average number (%) of (MA) arrangements can be determined in conformity with a standard method, such as $^{19}$F-NMR.

The monomer (α) preferably includes at least one selected from the group consisting of a hydrophilic (meth)acrylic monomer (MA), maleic acid, and chlorotrifluoroethylene. In terms of adhesiveness to a current collector, particularly preferred is a hydrophilic (meth)acrylic monomer (MA).

The PVdF (B) preferably contains a polymerized unit based on the monomer (α) in an amount of 10 mol % or less, more preferably 5 mol % or less, still more preferably 3 mol % or less, relative to all polymerized units.

The PVdF (B) preferably has a weight average molecular weight (in polystyrene equivalent) of 200000 to 2400000, more preferably 400000 or higher, still more preferably 600000 or higher, while more preferably 2200000 or lower, still more preferably 2000000 or lower.

In terms of adhesiveness, the weight average molecular weight (in polystyrene equivalent) of the PVdF (B) is preferably 150000 or higher, more preferably 200000 or higher, still more preferably 400000 or higher.

The weight average molecular weight can be determined by gel permeation chromatography (GPC) using N,N-dimethylformamide as a solvent at 50° C.

The PVdF (B) has a number average molecular weight (in polystyrene equivalent) of 70000 to 1200000.

The number average molecular weight is preferably 140000 or higher and 1100000 or lower.

The number average molecular weight can be determined by gel permeation chromatography (GPC) using N,N-dimethylformamide as a solvent at 50° C.

The binder of the invention preferably contains the fluorine-containing polymer (A) and the PVdF (B) at a mass ratio (A)/(B) of 5/95 to 95/5, more preferably 10/90 to 90/10, still more preferably 15/85 to 85/15.

The binder satisfying the above range can lead to a much improved density of an electrode, much improved adhesiveness to a current collector, much improved flexibility of an electrode, and much improved viscosity retention of slurry.

In order to achieve much improved viscosity retention of slurry, the mass ratio (A)/(B) is also preferably 5/95 to 70/30.

In terms of a high density of an electrode and adhesiveness to a current collector, the mass ratio (A)/(B) is preferably 10/90 to 95/5, more preferably 15/85 to 95/5.

Combination use of the fluorine-containing polymer (A) and the PVdF (B) allows the binder of the invention to particularly lead to improved viscosity retention of slurry in comparison with the use of the fluorine-containing polymer (A) alone. Further, even with the improved viscosity retention of slurry, the binder enables maintenance of an excellently high density of an electrode, excellent adhesiveness to a current collector, and excellent flexibility of an electrode.

The fluorine-containing polymer (A) tends to cause a higher production cost than PVdF. Still, in the binder of the invention, combination use of the fluorine-containing polymer (A) and the PVdF (B) can reduce the amount of the fluorine-containing polymer (A) used, which is a significant advantage in terms of cost.

In the binder of the invention, one fluorine-containing polymer (A) may be used or two or more thereof may be used in combination. Also, one PVdF (B) may be used or two or more thereof may be used in combination.

For example, one fluorine-containing polymer (A) and two or more PVdFs (B) may be used in combination. Two or more fluorine-containing polymers (A) and one PVdF (B) may be used in combination. Of course, two or more fluorine-containing polymers (A) and two or more PVdFs (B) may be used in combination.

The binder of the invention may further contain a different component as long as the binder contains the fluorine-containing polymer (A) and the PVdF (B). The different component may include one or two or more types thereof.

Examples of the different component to be used in the binder include a VdF polymer other than the fluorine-containing polymer (A) and the PVdF (B), polymethacrylate, polymethyl methacrylate, polyacrylonitrile, polyimide, polyamide, polyamide-imide, polycarbonate, styrene rubber, and butadiene rubber. Preferred is a VdF polymer.

These different components are preferably in an amount of 10% by mass or less, more preferably 7% by mass or less, relative to the sum of the amounts of the fluorine-containing polymer (A) and the PVdF (B). The amount may also be 0.01% by mass or more relative to the sum of the amounts of the fluorine-containing polymer (A) and the PVdF (B).

The VdF polymer contains a polymerized unit based on VdF, and is a polymer different from the fluorine-containing polymer (A) and the PVdF (B).

The VdF polymer is preferably free from a polymerized unit based on the monomer (2-2).

The VdF polymer preferably has a weight average molecular weight (polystyrene equivalent) of 200000 to 2400000, more preferably 400000 to 2200000, still more preferably 600000 to 2000000.

The weight average molecular weight can be determined by gel permeation chromatography (GPC) using N,N-dimethylformamide as a solvent at 50° C.

The VdF polymer preferably has a number average molecular weight (polystyrene equivalent) of 70000 to 1200000, more preferably 140000 to 1100000.

The number average molecular weight can be determined by gel permeation chromatography (GPC) using N,N-dimethylformamide as a solvent at 50° C.

The VdF polymer may be a polymer consisting of a polymerized unit based on VdF, or may be a polymer containing a polymerized unit based on VdF and a polymerized unit based on a monomer copolymerizable with VdF.

The VdF polymer preferably contains the polymerized unit based on VdF in an amount of 50 mol % or more, more preferably 60 mol % or more, relative to all polymerized units. The amount of the polymerized unit based on VdF may be 100 mol % or less.

In the VdF polymer, examples of the monomer copolymerizable with VdF include, but are not limited to, tetrafluoroethylene (TFE), hexafluoropropylene (HFP), chlorotrifluoroethylene (CTFE), 2,3,3,3-tetrafluoropropene, (meth)acrylic monomers (preferably, hydrophilic (meth)acrylic monomers), vinyl fluoride, trifluoroethylene, fluoroalkyl vinyl ether, propylene, and trans-1,3,3,3-tetrafluoropropene.

Monomers to be contained in polymers to be mentioned as examples of the VdF polymer, such as a VdF/TFE copolymer to be described later, may also be used.

The VdF polymer preferably contains a polymerized unit based on a monomer copolymerizable with VdF in an amount of 50 mol % or less, more preferably 40 mol % or less, relative to all polymerized units. The amount of the polymerized unit based on a monomer copolymerizable with VdF may be 0 mol % or more.

The VdF polymer preferably includes at least one polymer selected from the group consisting of a VdF/tetrafluoroethylene (TFE) copolymer, a VdF/hexafluoropropylene (HFP) copolymer, a VdF/chlorotrifluoroethylene (CTFE) copolymer, and a VdF/2,3,3,3-tetrafluoropropene copolymer.

The VdF/TFE copolymer is a copolymer containing a polymerized unit (VdF unit) based on VdF and a polymerized unit (TFE unit) based on TFE.

The VdF/TFE copolymer preferably contains the VdF unit in an amount of 50 to 95 mol % relative to all polymerized units. Less than 50 mol % of the VdF unit may cause a great change in viscosity of the electrode mixture over time. More than 95 mol % thereof may cause poor flexibility of the electrode to be obtained from the mixture.

The VdF/TFE copolymer preferably contains the VdF unit in an amount of 55 mol % or more, more preferably 60 mol % or more, relative to all polymerized units. The VdF/TFE copolymer more preferably contains the VdF unit in an amount of 92 mol % or less, still more preferably 89 mol % or less, relative to all polymerized units.

The composition of the VdF/TFE copolymer can be determined using a NMR analyzer.

In addition to the VdF unit and the TFE unit, the VdF/TFE copolymer may further contain a polymerized unit based on a monomer copolymerizable with VdF and TFE. The adhesiveness can be further improved when a monomer copolymerizable with these monomers is copolymerized to the extent that does not impair excellent swelling resistance against the electrolyte solution of the copolymer.

The amount of the polymerized unit based on the monomer copolymerizable with VdF and TFE is preferably less than 3.0 mol % relative to all polymerized units of the VdF/TFE copolymer. Not less than 3.0 mol % of this polymerized unit typically tends to cause reduced crystallinity of the copolymer of VdF and TFE, resulting in poor swelling resistance against the electrolyte solution.

Examples of the monomer copolymerizable with VdF and TFE include unsaturated dibasic acid monoesters as disclosed in JP H06-172452 A, such as monomethyl maleate, monomethyl citraconate, monoethyl citraconate, and vinylene carbonate; compounds containing a hydrophilic polar group e.g., $-SO_3M$, $-OSO_3M$, $-COOM$, $-OPO_3M$ (wherein M is an alkali metal), or an amine polar group represented by $-NHR^a$ or $-NR^bR^c$ (wherein $R^a$, $R^b$, and $R^c$ are each an alkyl group) as disclosed in JP H07-201316 A, such as $CH_2=CH-CH_2-A$, $CH_2=C(CH_3)-CH_2-A$, $CH_2=CH-CH_2-O-CO-CH(CH_2COOR^d)-A$, $CH_2=CH-CH_2-O-CH_2-CH(OH)-CH_2-A$, $CH_2=C(CH_3)-CO-O-CH_2-CH_2-CH_2-A$, $CH_2=CH-CO-O-CH_2-CH_2-A$, and $CH_2=CHCO-NH-C(CH_3)_2-CH_2-A$ (wherein A is a hydrophilic polar group; and $R^d$ is an alkyl group), and maleic acid and maleic anhydride. Examples of the copolymerizable monomer to be used also include hydroxylated allyl ether monomers such as $CH_2=CH-CH_2-O-(CH_2)_n-OH$ (3≤n≤8),

[Chem. 10]

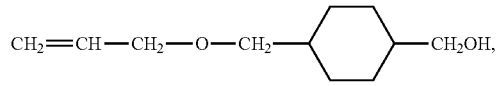

$CH_2=CH-CH_2-O-(CH_2-CH_2-O)_n-H$ (1≤n≤14), and $CH_2=CH-CH_2-O-(CH_2-CH(CH_3)-O)_n-H$ (1≤n≤14); and allyl ether or ester monomers carboxylated and/or substituted with $-(CF_2)_n-CF_3$ (3≤n≤8), such as $CH_2=CH-CH_2-O-CO-C_2H_4-COOH$, $CH_2=CH-CH_2-O-CO-C_5H_{10}-COOH$, $CH_2=CH-CH_2-O-C_2H_4-(CF_2)_nCF_3$, $CH_2=CH-CH_2-CO-O-C_2H_4-(CF_2)_nCF_3$, and $CH_2=C(CH_3)-CO-O-CH_2-CF_3$.

Studies up to now enable analogical inference that those other than the compounds containing a polar group as described above can lead to improved adhesiveness to a current collector made of foil of metal such as aluminum or copper by slightly reducing the crystallinity of the fluorine-containing polymer (A) to give flexibility to the material. This makes it possible to use any of unsaturated hydrocarbon monomers ($CH_2=CHR$, wherein R is a hydrogen atom, an alkyl group, or a halogen such as Cl) such as ethylene and propylene, fluorine-based monomers such as ethylene chloride trifluoride, hexafluoropropylene, hexafluoroisobutene, 2,3,3,3-tetrafluoropropene, $CF_2=CF-O-C_nF_{2n+1}$ (wherein n is an integer of 1 or greater), $CH_2=CF-C_nF_{2n+1}$ (wherein n is an integer of 1 or greater), $CH_2=CF-(CF_2CF_2)_nH$ (wherein n is an integer of 1 or greater), and $CF_2=CF-O-(CF_2CF(CF_3)O)_m-C_nF_{2n+1}$ (wherein m and n are each an integer of 1 or greater).

Also used is a fluorine-containing ethylenic monomer containing at least one functional group represented by the following formula:

[Chem. 11]

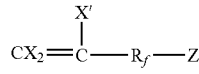

(wherein Z is $-CH_2OH$, $-COOH$, a carboxylic acid salt, a carboxy ester group, or an epoxy group; X and X' are the same as or different from each other, and are each a hydrogen atom or a fluorine atom; and $R_f$ is a C1-C40 divalent fluorine-containing alkylene group or a C1-C40 divalent fluorine-containing alkylene group containing an ether bond). One or two or more of these monomers may be copolymerized to lead to much improved adhesiveness to a current collector, to prevent peeling of an electrode active material from the current collector even after repeated charge and discharge, and to lead to good charge and discharge cycle characteristics.

In terms of flexibility and chemical resistance, particularly preferred among these monomers are hexafluoropropylene and 2,3,3,3-tetrafluoropropene.

As described above, the VdF/TFE copolymer may further contain a polymerized unit different from the VdF unit and the TFE unit. Still, the VdF/TFE copolymer more preferably consists of the VdF unit and the TFE unit.

The VdF/TFE copolymer preferably has a weight average molecular weight (polystyrene equivalent) of 200000 to 2400000, more preferably 400000 to 2200000, still more preferably 600000 to 2000000.

The weight average molecular weight can be determined by gel permeation chromatography (GPC) using N,N-dimethylformamide as a solvent at 50° C.

The VdF/TFE copolymer preferably has a number average molecular weight (polystyrene equivalent) of 70000 to 1200000, more preferably 140000 to 1100000.

The number average molecular weight can be determined by gel permeation chromatography (GPC) using N,N-dimethylformamide as a solvent at 50° C.

The VdF/TFE copolymer may be produced by a method including, for example, mixing the monomers to form the polymerized units such as VdF and TFE and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, and each of these may be any conventionally known one.

The VdF/HFP copolymer is a copolymer containing a polymerized unit (VdF unit) based on VdF and a polymerized unit (HFP unit) based on HFP.

The VdF/HFP copolymer preferably contains the VdF unit in an amount of 80 to 98 mol % relative to all polymerized units. Less than 80 mol % of the VdF unit tends to cause large swelling of the resulting electrode in an electrolyte solution, significantly impairing the battery characteristics. More than 98 mol % thereof tends to cause poor flexibility of the electrode to be obtained from the mixture.

The VdF/HFP copolymer more preferably contains the VdF unit in an amount of 83 mol % or more, still more preferably 85 mol % or more, relative to all polymerized units. The VdF/HFP copolymer more preferably contains the VdF unit in an amount of 97 mol % or less, still more preferably 96 mol % or less, relative to all polymerized units.

The composition of the VdF/HFP copolymer can be determined using a NMR analyzer.

In addition to the VdF unit and the HFP unit, the VdF/HFP copolymer may further contain a polymerized unit based on a monomer copolymerizable with VdF and HFP. A copolymer of VdF and HFP is sufficient to achieve the effects of the invention, but the adhesiveness can be further improved when a monomer copolymerizable with these monomers is copolymerized to the extent that does not impair excellent swelling resistance against the electrolyte solution of the copolymer.

The amount of the polymerized unit based on the monomer copolymerizable with VdF and HFP is preferably less than 3.0 mol % relative to all polymerized units of the VdF/HFP copolymer. Not less than 3.0 mol % of this polymerized unit may typically cause reduced crystallinity of the copolymer of VdF and HFP, resulting in reduced swelling resistance against the electrolyte solution.

Examples of the monomer copolymerizable with VdF and HFP include the same monomers as the monomers copolymerizable with VdF and TFE mentioned for the VdF/TFE copolymer, and TFE.

The VdF/HFP copolymer preferably has a weight average molecular weight (polystyrene equivalent) of 200000 to 2400000, more preferably 400000 to 2200000, still more preferably 600000 to 2000000.

The weight average molecular weight can be determined by gel permeation chromatography (GPC) using N,N-dimethylformamide as a solvent at 50° C.

The VdF/HFP copolymer preferably has a number average molecular weight (polystyrene equivalent) of 70000 to 1200000, more preferably 140000 to 1100000.

The number average molecular weight can be determined by gel permeation chromatography (GPC) using N,N-dimethylformamide as a solvent at 50° C.

The VdF/HFP copolymer may be produced by a method including, for example, mixing the monomers to form the polymerized units such as VdF and HFP and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, and each of these may be any conventionally known one.

The VdF/CTFE copolymer is a copolymer containing a polymerized unit (VdF unit) based on VdF and a polymerized unit (CTFE unit) based on CTFE.

The VdF/CTFE copolymer preferably contains the VdF unit in an amount of 80 to 98 mol % relative to all polymerized units. Less than 80 mol % or more than 98 mol % of the VdF unit may cause a great change in viscosity of the electrode mixture over time. The VdF/CTFE copolymer more preferably contains the VdF unit in an amount of 97.5 mol % or less, still more preferably 97 mol % or less, relative to all polymerized units.

The VdF/CTFE copolymer preferably contains the VdF unit in an amount of 85 mol % or more, more preferably 90 mol % or more, relative to all polymerized units.

The composition of the VdF/CTFE copolymer can be determined using a NMR analyzer.

In addition to the VdF unit and the CTFE unit, the VdF/CTFE copolymer may further contain a polymerized unit based on a monomer copolymerizable with VdF and CTFE. A copolymer of VdF and CTFE is sufficient to achieve the effects of the invention, but the adhesiveness can be further improved when a monomer copolymerizable with these monomers is copolymerized to the extent that does not impair excellent swelling resistance against the electrolyte solution of the copolymer.

The amount of the polymerized unit based on the monomer copolymerizable with VdF and CTFE is preferably 10.0 mol % or less, more preferably 5.0 mol % or less, relative to all polymerized units of the VdF/CTFE copolymer. More than 10.0 mol % of this polymerized unit typically tends to cause significantly reduced crystallinity of the copolymer of VdF and CTFE, resulting in reduced swelling resistance against the electrolyte solution.

Examples of the monomer copolymerizable with VdF and CTFE include the same monomers as the monomers copolymerizable with VdF and TFE mentioned for the VdF/TFE copolymer, TFE, and HFP.

The VdF/CTFE copolymer preferably has a weight average molecular weight (polystyrene equivalent) of 200000 to 2400000, more preferably 400000 to 2200000, still more preferably 600000 to 2000000.

The weight average molecular weight can be determined by gel permeation chromatography (GPC) using N,N-dimethylformamide as a solvent at 50° C.

The VdF/CTFE copolymer preferably has a number average molecular weight (polystyrene equivalent) of 70000 to 1200000, more preferably 140000 to 1100000.

The number average molecular weight can be determined by gel permeation chromatography (GPC) using N,N-dimethylformamide as a solvent at 50° C.

The VdF/CTFE copolymer may be produced by a method including, for example, mixing the monomers to form the polymerized units such as VdF and CTFE and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, and each of these may be any conventionally known one.

The VdF/2,3,3,3-tetrafluoropropene copolymer is a copolymer containing a polymerized unit (VdF unit) based on VdF and a polymerized unit (2,3,3,3-tetrafluoropropene unit) based on 2,3,3,3-tetrafluoropropene.

The VdF/2,3,3,3-tetrafluoropropene copolymer preferably contains the VdF unit in an amount of 80 to 98 mol % relative to all polymerized units. Less than 80 mol % or more than 98 mol % of the VdF unit may cause a great change in viscosity of the electrode mixture over time.

The VdF/2,3,3,3-tetrafluoropropene copolymer more preferably contains the VdF unit in an amount of 97.5 mol % or less, still more preferably 97 mol % or less, relative to all polymerized units.

The VdF/2,3,3,3-tetrafluoropropene copolymer preferably contains the VdF unit in an amount of 85 mol % or more, more preferably 90 mol % or more, relative to all polymerized units.

The composition of the VdF/2,3,3,3-tetrafluoropropene copolymer can be determined using a NMR analyzer.

In addition to the VdF unit and the 2,3,3,3-tetrafluoropropene unit, the VdF/2,3,3,3-tetrafluoropropene copolymer may further contain a polymerized unit based on a monomer copolymerizable with VdF and 2,3,3,3-tetrafluoropropene. A copolymer of VdF and 2,3,3,3-tetrafluoropropene is sufficient to achieve the effects of the invention, but the adhesiveness can be further improved when a monomer copolymerizable with these monomers is copolymerized to the extent that does not impair excellent swelling resistance against the electrolyte solution of the copolymer.

The amount of the polymerized unit based on the monomer copolymerizable with VdF and 2,3,3,3-tetrafluoropropene is preferably less than 3.0 mol % relative to all polymerized units of the VdF/2,3,3,3-tetrafluoropropene copolymer. Not less than 3.0 mol % of this polymerized unit may typically cause reduced crystallinity of the copolymer of VdF and 2,3,3,3-tetrafluoropropene, resulting in reduced swelling resistance against the electrolyte solution.

Examples of the monomer copolymerizable with VdF and 2,3,3,3-tetrafluoropropene include the same monomers as the monomers copolymerizable with VdF and TFE mentioned for the VdF/TFE copolymer, TFE, and HFP.

The VdF/2,3,3,3-tetrafluoropropene copolymer preferably has a weight average molecular weight (polystyrene equivalent) of 200000 to 2400000, more preferably 400000 to 2200000, still more preferably 600000 to 2000000.

The weight average molecular weight can be determined by gel permeation chromatography (GPC) using N,N-dimethylformamide as a solvent at 50° C.

The VdF/2,3,3,3-tetrafluoropropene copolymer preferably has a number average molecular weight (polystyrene equivalent) of 70000 to 1200000, more preferably 140000 to 1100000.

The number average molecular weight can be determined by gel permeation chromatography (GPC) using N,N-dimethylformamide as a solvent at 50° C.

The VdF/2,3,3,3-tetrafluoropropene copolymer may be produced by a method including, for example, mixing the monomers to form the polymerized units such as VdF and CTFE and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, and each of these may be any conventionally known one.

The binder of the invention, containing the fluorine-containing polymer (A) and the PVdF (B), has good adhesiveness to a current collector and excellent flexibility, as well as excellent gelling resistance and excellent slurry dispersibility, and thus is suitable as a binder for an electrode of a secondary battery. Further, this binder can lead to a high density and is expected to give a density of 3.4 g/cc or higher, or further 3.6 g/cc or higher, to a positive electrode mixture film. The binder of the invention can also be used as a binder for a separator coating of a secondary battery. The binder for a secondary battery herein includes binders used for a positive electrode, a negative electrode, and a separator of a secondary battery. The secondary battery is preferably a lithium ion secondary battery.

The binder of the invention may constitute an electrode mixture together with an active material and water or a nonaqueous solvent. The secondary battery to which the binder of the invention is applied includes a positive electrode containing a positive electrode mixture carried on a positive electrode current collector, a negative electrode containing a negative electrode mixture carried on a negative electrode current collector, and an electrolyte solution.

The following describes an example of a mixture for producing an electrode of a battery (electrode mixture) using the binder of the invention.

For nonaqueous electrolyte solution batteries containing an organic or nonaqueous electrolyte solution as an electrolyte solution, such as lithium ion secondary batteries, the active material layer is made thin and the area of the electrode is increased so as to improve the heavy load performance due to a low electrical conductivity of the nonaqueous electrolyte solution.

In order to achieve this, production of an electrode is examined in which a composition for forming an electrode mixture containing a powdery active material, a conductive agent such as carbon, and a binder is applied and bonded to a current collector made of foil or net of metal such as iron, stainless steel, copper, aluminum, nickel, or titanium. The amount of the binder used needs to be reduced as small as possible. Thus, the binder needs to hold the components such as an active material and have excellent adhesiveness to a current collector even when used in a small amount. The binder typically insulates the electricity, so that an increase in the amount of the binder increases the internal resistance of the battery. Also, in this respect, the amount of the binder for providing its functions needs to be as small as possible.

The amount of the binder is preferably typically very small, and is preferably 30% by mass or less relative to the whole electrode mixture. Such a small amount of the binder fails to completely fill the gaps between fine particle components of the electrode mixture or the gaps between the fine particle component and the current collector. In the case of coatings containing filler such as pigments or lining materials, a large amount of binder sufficient to completely fill the gaps between filler components is used. Thus, problems relating to holding of filler hardly arise. In contrast, in the case of binders for electrodes, the amount thereof is very small as described above. Thus, the binder needs to hold the active material well and have excellent adhesiveness to a current collector even when used in a small amount.

The invention also relates to an electrode mixture for a secondary battery, containing a mixture that contains at least: the aforementioned binder for a secondary battery of the invention, a powdery electrode material for a battery, and water or a nonaqueous solvent. The electrode mixture is preferably an electrode mixture for a secondary battery prepared by mixing a solution or dispersion containing the aforementioned binder for a secondary battery of the invention dispersed or dissolved in water or a nonaqueous solvent, and a powdery electrode material for a battery. The electrode mixture is more preferably an electrode mixture for a lithium ion secondary battery. The electrode mixture of the invention contains the aforementioned binder, and thus can form an electrode material layer leading to excellent adhesiveness to a current collector and excellent flexibility of an electrode. Such an electrode mixture causes less electrode unevenness, and thus is expected to lead to improved rate characteristics of a battery. The electrode mixture may be a positive electrode mixture used for production of a positive electrode, or may be a negative electrode mixture used for production of a negative electrode. It is preferably a positive electrode mixture.

The powdery electrode material preferably contains an electrode active material. The electrode active material is divided into a positive electrode active material and a negative electrode active material. In the case of a lithium ion secondary battery, the positive electrode active material may be any one capable of electrochemically occluding and releasing lithium ions. Preferred are lithium composite oxides, more preferably lithium transition metal composite oxides. The positive electrode active material is also preferably a lithium-containing transition metal phosphate compound. The positive electrode active material is also preferably a substance containing lithium and at least one transition metal, such as a lithium transition metal composite oxide or a lithium-containing transition metal phosphate compound.

The transition metal in the lithium transition metal composite oxide is preferably V, Ti, Cr, Mn, Fe, Co, Ni, Cu, or the like. Specific examples of the lithium transition metal composite oxide include lithium cobalt composite oxides such as $LiCoO_2$, lithium nickel composite oxides such as $LiNiO_2$, lithium manganese composite oxides such as $LiMnO_2$, $LiMn_2O_4$, and $Li_2MnO_3$, and those derived from these lithium transition metal composite oxides in which some of the main transition metal atoms are replaced by metal atoms such as Al, Ti, V, Cr, Mn, Fe, Co, Li, Ni, Cu, Zn, Mg, Ga, Zr, or Si. Examples of the compounds prepared by the substitution include lithium nickel manganese composite oxides, lithium nickel cobalt aluminum composite oxides, lithium nickel cobalt manganese composite oxides, lithium manganese aluminum composite oxides, and lithium titanium composite oxides. Specific examples thereof include $LiNi_{0.5}Mn_{0.5}O_2$, $LiNi_{0.85}Co_{0.10}Al_{0.50}O_2$, $LiNi_{0.33}Co_{0.33}Mn_{0.33}O_2$, $LiN_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, $LiMn_{1.8}Al_{0.2}O_4$, $LiMn_{1.5}Ni_{0.5}O_4$, $Li_4Ti_5O_{12}$, and $LiNi_{0.82}Co_{0.15}Al_{0.03}O_2$.

The transition metal in the lithium-containing transition metal phosphate compound is preferably V, Ti, Cr, Mn, Fe, Co, Ni, Cu, or the like. Specific examples of the lithium-containing transition metal phosphate compound include iron phosphates such as $LiFePO_4$, $Li_3Fe_2(PO_4)_3$, and $LiFeP_2O_7$, cobalt phosphates such as $LiCoPO_4$, and those derived from these lithium transition metal phosphate compounds in which some of the main transition metal atoms are replaced by metal atoms such as Al, Ti, V, Cr, Mn, Fe, Co, Li, Ni, Cu, Zn, Mg, Ga, Zr, Nb, or Si.

In terms of high voltage, high energy density, or charge and discharge cycle characteristics, particularly preferred are $LiCoO_2$, $LiNiO_2$, $LiMn_2O_4$, $LiNi_{0.82}Co_{0.15}Al_{0.03}O_2$, $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, and $LiFePO_4$.

To the surface of each of these positive electrode active materials may be attached a substance which has a composition different from that of the main substance constituting the positive electrode active material. Examples of the surface-attaching substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

These surface-attaching substances can be attached to the surface of the positive electrode active material by, for example, a method in which the substance is dissolved or suspended in a solvent, the solution or suspension is impregnated into the positive electrode active material, and the workpiece is dried; a method in which the surface-attaching substance precursor is dissolved or suspended in a solvent, the solution or suspension is impregnated into the positive electrode active material, and they are reacted with each other by heating; or a method in which the substance is added to a positive electrode active material precursor and they are fired simultaneously.

The lower limit of the amount by mass of the surface-attaching substance is preferably 0.1 ppm or more, more preferably 1 ppm or more, still more preferably 10 ppm or more, while the upper limit thereof is preferably 20% or less, more preferably 10% or less, still more preferably 5% or less, relative to the positive electrode active material. The surface-attaching substance can reduce an oxidation reaction of the nonaqueous electrolyte solution on the surface of the positive electrode active material, improving the battery life. Too small an amount thereof may fail to sufficiently provide the effects thereof. Too large an amount thereof may inhibit occlusion and release of lithium ions, increasing the resistance.

Particles of the positive electrode active material have a conventionally known shape such as a massive shape, polyhedral shape, spherical shape, ellipsoidal shape, plate shape, needle shape, or pillar shape. Preferably, primary particles agglomerate to form secondary particles and such secondary particles have a spherical or ellipsoidal shape. In typical electrochemical devices, the active material in an electrode expands and contracts during charge and discharge. The stress of such expansion and contraction is likely to cause impairment such as breakage of the active material and breakage of conductive paths. Thus, the active material is more preferably in the form of secondary particles formed by agglomeration of primary particles than in the form of primary particles alone because such a form can ease the stress of expansion and contraction and reduce impairment. Further, spherical or ellipsoidal particles are more preferred than axially oriented particles, such as plate-like particles, because the former particles show less orientation in molding of an electrode, cause less expansion and contraction of an electrode during charge and discharge, and are likely to be uniformly mixed with a conductive agent in formation of an electrode.

The positive electrode active material typically has a tap density of 1.3 g/cm$^3$ or higher, preferably 1.5 g/cm$^3$ or higher, still more preferably 1.6 g/cm$^3$ or higher, most preferably 1.7 g/cm$^3$ or higher. The positive electrode active material having a tap density below the lower limit may cause an increase in the amount of dispersion medium required and the amounts of additives such as a conductive material and a binder required in formation of the positive electrode active material layer, restricting the proportion of the positive electrode active material filled into the positive electrode active material layer and restricting the battery capacity. A powdery metal composite oxide having a high tap density can provide a high-density positive electrode active material layer. The tap density is usually preferably as high as possible and has no upper limit. Still, too high a tap density may limit diffusion of lithium ions in the positive electrode active material layer through the medium of a nonaqueous electrolyte solution and may cause easy reduction in load characteristics. Thus, the tap density is usually 2.5 g/cm$^3$ or lower, preferably 2.4 g/cm$^3$ or lower.

The tap density of the positive electrode active material is defined as follows. Specifically, a sample is passed through a sieve with an opening of 300 µm and is put into a 20-cm$^3$ tapping cell to fill the cell capacity. Tapping is then performed 1000 times with a stroke of 10 mm using a powder density meter (e.g., tap denser, available from Seishin Enterprise Co., Ltd.). The density calculated from the volume and the weight of the sample after the tapping is defined as the tap density.

The positive electrode active material particles typically have a median size d50 (secondary particle size in the case of secondary particles formed from agglomerated primary particles) of 0.1 µm or greater, preferably 0.5 µm or greater, more preferably 1 µm or greater, most preferably 3 µm or greater, while typically 20 µm or smaller, preferably 18 µm or smaller, more preferably 16 µm or smaller, most preferably 15 µm or smaller. The particles having a median size below the lower limit may fail to provide an article having a high bulk density. The particles having a median size above the upper limit may cause lithium in the particles to take a long time to diffuse, which may cause reduced battery performance and defects such as streaks in formation of a positive electrode of a battery, i.e., when the active material and additives such as a conductive agent and a binder are formed into slurry with a solvent and this slurry is applied in a film form. Use of two or more positive electrode active materials having different median sizes d50 as a mixture can further improve the packing easiness in formation of a positive electrode.

The median size d50 in the invention is measured using a known laser diffraction/scattering particle size distribution analyzer. In the case of a particle size distribution analyzer LA-920 (available from Horiba, Ltd.), the dispersion medium used in the measurement is a 0.1% by mass aqueous solution of sodium hexametaphosphate, and ultrasonic dispersion is performed for five minutes and the measurement refractive index is set to 1.24 for the measurement.

In the case of secondary particles formed by agglomerated primary particles, the average primary particle size of the positive electrode active material is typically 0.01 µm or greater, preferably 0.05 µm or greater, still more preferably 0.08 µm or greater, most preferably 0.1 µm or greater, while typically 3 µm or smaller, preferably 2 µm or smaller, still more preferably 1 µm or smaller, most preferably 0.6 µm or smaller. Primary particles having an average primary particle size above the upper limit are difficult to form spherical secondary particles. Such particles may affect powder packing and may have a greatly reduced specific surface area, highly possibly reducing the battery performance such as output characteristics. Primary particles having an average primary particle size below the lower limit typically contain ungrown crystals, causing disadvantages such as poor reversibility of charge and discharge. The primary particle size is measured by observation using a scanning electron microscope (SEM). Specifically, in a 10000× photograph, the longest linear section between the left and right boundary of each primary particle in the horizontal direction is obtained for any 50 primary particles, and the average value thereof is calculated.

The positive electrode active material has a BET specific surface area of 0.2 m$^2$/g or larger, preferably 0.3 m$^2$/g or larger, still more preferably 0.4 m$^2$/g or larger, while 4.0 m$^2$/g or smaller, preferably 2.5 m$^2$/g or smaller, still more preferably 1.5 m$^2$/g or smaller. The active material having a BET specific surface area smaller than the above range is likely to cause reduced battery performance. The active material having a BET specific surface area larger than the above range is less likely to give an increased tap density, causing disadvantages in application performance of the material in formation of the positive electrode active material.

The BET specific surface area is defined by the value measured as follows. Specifically, a sample is pre-dried in nitrogen stream at 150° C. for 30 minutes, and the BET specific surface area of the sample is measured by the nitrogen adsorption single point BET method utilizing the flowing gas technique using a surface area analyzer (e.g., automatic surface area meter, available from Ohkura Riken, Inc.) with a gas mixture of nitrogen and helium whose nitrogen relative pressure is precisely controlled to 0.3 relative to the atmospheric pressure.

The positive electrode active material may be produced by a common method for producing an inorganic compound. In particular, various methods may be applied for production of a spherical or ellipsoidal active material. Examples thereof include: a method in which a transition metal material substance such as a transition metal nitrate or sulfate and optionally another element material substance are dissolved or pulverized and dispersed in a solvent such as water, the pH of the solution or dispersion is adjusted under stirring and a spherical precursor is formed and collected, the spherical precursor is optionally dried, a Li source such as LiOH, Li$_2$CO$_3$, or LiNO$_3$ is added thereto, and the mixture is fired at high temperature, whereby the active material is obtained; a method in which a transition metal material substance such as transition metal nitrate, sulfate, hydroxide, or oxide and optionally another element material substance is dissolved or pulverized and dispersed in a solvent such as water, the solution or dispersion is dried and shaped into a spherical or ellipsoidal precursor using a spray drier, a Li source such as LiOH, $Li_2CO_3$, or $LiNO_3$ is added thereto, and the mixture is fired at high temperature, whereby the active material is obtained; and a method in which a transition metal material substance such as transition metal nitrate, sulfate, hydroxide, or oxide, a Li source such as LiOH, $Li_2CO_3$, or $LiNO_3$, and optionally another element material substance are dissolved or pulverized and dispersed in a solvent such as water, the solution or dispersion is dried and shaped into a spherical or ellipsoidal precursor using a spray drier, and this precursor is fired at high temperature, whereby the active material is obtained.

In the invention, one powdery positive electrode active material may be used alone, or two or more powdery positive electrode active materials having different compositions or different powdery physical properties may be used in any combination at any ratio.

The negative electrode active material may be any one that can electrochemically occlude and release lithium ions. Examples thereof include carbonaceous materials, metal oxides such as tin oxide and silicon oxide, metal composite oxides, simple lithium and lithium alloys such as lithium aluminum alloy, and metals alloyable with lithium such as Sn and Si. These materials may be used alone or in any combination of two or more at any ratio. In terms of safety, preferred are carbonaceous materials and lithium composite oxides.

The metal composite oxides may be any of those capable of occluding and releasing lithium. In terms of high-current-density charge and discharge characteristics, preferred are those containing titanium and/or lithium as constituents.

In order to achieve good balance between the initial irreversible capacity and the high-current-density charge and discharge characteristics, the carbonaceous materials are preferably selected from:

(1) natural graphite, (2) artificial carbonaceous substances and artificial graphite substances; carbonaceous materials obtained by one or more heating treatments at 400° C. to 3200° C. on any of carbonaceous substances {e.g., natural graphite, coal-based coke, petroleum-based coke, coal-based pitch, petroleum-based pitch, and products of oxidizing these pitches, needle coke, pitch coke, and carbon materials produced by partially graphitizing them, furnace black, acetylene black, and pyrolysates of organic matter such as pitch-based carbon fibers, carbonizable organic matter (e.g., coal tar pitch ranging from soft pitch to hard pitch, coal-based heavy oil such as carbonized liquefied oil, straight heavy oil such as atmospheric residue and vacuum residue, decomposed petroleum heavy oil such as ethylene tar which is a by-product in thermal cracking of crude oil or naphtha, aromatic hydrocarbons such as acenaphthylene, decacyclene, anthracene, and phenanthrene, N-cyclic compounds such as phenazine and acridine, S-cyclic compounds such as thiophene and bithiophene, polyphenylenes such as biphenyl and terphenyl, polyvinyl chloride, polyvinyl alcohol, polyvinyl butyral, insolubilized products thereof, nitrogen-containing organic polymers such as polyacrylonitrile and polypyrrole, sulfur-containing organic polymers such as polythiophene and polystyrene, natural polymers such as polysaccharides typified by cellulose, lignin, mannan, polygalacturonic acid, chitosan, and saccharose, thermoplastic resins such as polyphenylene sulfide and polyphenylene oxide, and thermosetting resins such as furfuryl alcohol resin, phenol-formaldehyde resin, and imide resin), carbides thereof, solutions of carbonizable organic matter in a low-molecular-weight organic solvent such as benzene, toluene, xylene, quinoline, or n-hexane, and carbides thereof};

(3) carbonaceous materials which allow the negative electrode active material layer to contain at least two carbonaceous materials having different crystallinities and/or to have an interface between the carbonaceous materials having different crystallinities; and (4) carbonaceous materials which allow the negative electrode active material layer to contain at least two carbonaceous materials having different orientations and/or to have an interface between the carbonaceous materials having different orientations.

In order to increase the capacity of an electrode to be obtained, the amount of the electrode active material (positive electrode active material or negative electrode active material) is preferably 80% by mass or more in the electrode mixture.

The powdery electrode material may further contain a conductive agent. Examples of the conductive agent include carbon blacks such as acetylene black and Ketjen black, carbon materials such as graphite, carbon fiber, carbon nanotube, and carbon nanohorn.

The ratio by weight of the powdery components (active material and conductive agent) and the sum of the fluorine-containing polymer (A) and the PVdF (B) in the electrode mixture is typically about 80:20 to 99.5:0.5, and is determined in consideration of the retention of the powdery components, the adhesiveness to a current collector, and the conductivity of the electrode.

With the aforementioned ratio, the fluorine-containing polymer (A) cannot completely fill the gaps between the powdery components in the electrode mixture layer formed on the current collector. Still, when a liquid that can well dissolve or disperse the fluorine-containing polymer (A) and the PVdF (B) is used as a solvent, the fluorine-containing polymer (A) and the PVdF (B) are uniformly dispersed in the form of mesh in the electrode mixture layer dried, retaining the powdery components well. Thus, the use of such a liquid is preferred.

Examples of the liquid include water and nonaqueous solvents. Examples of the nonaqueous solvents include general-purpose organic solvents with a low boiling point, including nitrogen-containing organic solvents such as N-methyl-2-pyrrolidone, N,N-dimethylacetamide, and dimethylformamide; ketone solvents such as acetone, methyl ethyl ketone, cyclohexanone, and methyl isobutyl ketone; ester solvents such as ethyl acetate and butyl acetate; ether solvents such as tetrahydrofuran and dioxane; and solvent mixtures thereof.

The liquid is preferably N-methyl-2-pyrrolidone and/or N,N-dimethylacetamide because they can lead to excellent stability and easy coating of the resulting electrode mixture.

The amount of the liquid in the electrode mixture is determined in consideration of factors such as easiness of coating to a current collector and film formability after drying. The ratio by weight of the binder and the liquid is typically preferably 0.5:99.5 to 20:80.

In order to rapidly dissolve or disperse the fluorine-containing polymer (A) and the PVdF (B) in the liquid, these components are preferably used in the form of small particles with an average particle size of 1000 μm or smaller, particularly 30 to 350 μm.

In order to further improve the adhesiveness to a current collector, the electrode mixture may further contain any of acrylic resins such as polymethacrylate and polymethyl methacrylate, and polyimide, polyamide, and polyamide-imide resins. Further, a crosslinker may be added and radiation such as γ-rays or electron beams may be applied to form a crosslinking structure. The crosslinking may be achieved not only by irradiation but also by any other crosslinking technique. For example, a thermally crosslinkable amine-containing compound or cyanurate-containing compound may be added so as to perform thermal crosslinking.

In order to improve the dispersion stability of electrode slurry, the electrode mixture may contain a dispersant such as a resin-based or cationic surfactant or a nonionic surfactant having a surface-activating effect.

The proportion of the binder of the invention in the electrode mixture is preferably 0.1 to 10% by mass, more preferably 0.5 to 5% by mass, of the electrode mixture.

The electrode mixture preferably has a viscosity retention of 70% or higher, more preferably 80% or higher, while preferably lower than 300%.

The viscosity retention is a value calculated from the following formula by measuring, using a B-type viscometer at 25° C., the viscosity ($\eta 0$) in preparation of the mixture and the viscosity ($\eta a$) after 24 hours from the mixture preparation.

$$\text{Slurry stability}(Xa) = \eta a / \eta 0 \times 100 (\%)$$

In the formula, $\eta 0$ and $\eta a$ are each a viscosity after 10 minutes from the start of measurement using an M3 rotor at a rotation rate of 6 rpm.

The electrode mixture containing the binder is usually produced by dissolving or dispersing the binder in the liquid, and then dispersing the powdery electrode material in the solution or dispersion and mixing them. The resulting electrode mixture is uniformly applied to a current collector such as metal foil or metal mesh, and then dried and optionally pressed, whereby a thin electrode mixture layer is formed on the current collector. This product serves as a thin film electrode.

In an alternative method, for example, binder powder and electrode material powder are mixed in advance, and then the liquid is added to form a mixture. In a still alternative method, for example, binder powder and electrode material powder are heat-melted and the molten material is extruded through an extruder to form a thin-film mixture, and this mixture is attached to a current collector with a conductive adhesive or a general-purpose organic solvent applied thereto, whereby an electrode sheet is produced. In a still alternative method, a solution or dispersion of the binder is applied to an electrode material that is preformed in advance. As described above, the binder may be used in any methods.

The invention also relates to an electrode for a secondary battery containing the binder for a secondary battery of the invention. The electrode of the invention contains the aforementioned binder, and thus the electrode does not crack, does not cause falling of the powdery electrode material, and does not separate from the current collector even when the electrode material is applied thickly and then rolled or pressed so as to achieve densification.

The electrode preferably includes a current collector and an electrode material layer that is disposed on the current collector and that contains the powdery electrode material and the binder. The electrode may be either a positive electrode or a negative electrode, and is preferably a positive electrode.

The current collector (positive electrode current collector and negative electrode current collector) may be metal foil or metal mesh of iron, stainless steel, copper, aluminum, nickel, or titanium, for example. The positive electrode current collector is preferably aluminum foil and the negative electrode current collector is preferably copper foil, for example.

The electrode of the invention preferably has a peeling strength of 0.20 N/cm or higher, more preferably 0.25 N/cm or higher, between the current collector and the electrode material layer. The peeling strength is preferably as high as possible, and thus has no upper limit.

The peeling strength is a stress value (N/cm) determined as follows. Specifically, an electrode piece having a length of 1.2 cm and a width of 7.0 cm is prepared and the electrode material layer side thereof is fixed on a movable jig with a double-sided tape. Then, the current collector is pulled at 90° at a rate of 100 mm/min and the stress is measured using an autograph.

The electrode of the invention preferably has an electrode critical density of 3.4 g/cc or higher, more preferably 3.6 g/cc or higher.

The electrode critical density is a density of the electrode material layer after the electrode is repeatedly rolled at a pressure of 10 t using a roll press until no density change is observed. The density is a value calculated from the area, thickness, and weight of the electrode material layer measured.

The invention also relates to a secondary battery including the aforementioned electrode for a secondary battery of the invention. In the secondary battery of the invention, at least one selected from the positive electrode and the negative electrode is the aforementioned electrode for a secondary battery of the invention, and the positive electrode is preferably the aforementioned electrode for a secondary battery of the invention. The secondary battery is preferably a lithium ion secondary battery.

The secondary battery of the invention preferably further includes a nonaqueous electrolyte solution. The nonaqueous electrolyte solution may be any one, and an organic solvent of the electrolyte solution may include one or two or more of known hydrocarbon solvents such as propylene carbonate, ethylene carbonate, butylene carbonate, γ-butyrolactone, 1,2-dimethoxyethane, 1,2-diethoxyethane, dimethyl carbonate, and diethyl carbonate; and fluorosolvents such as fluoroethylene carbonate, fluoroether, and fluorinated carbonate. The electrolyte may also be any conventionally known one, such as $LiClO_4$, $LiAsF_6$, $LiPF_6$, $LiBF_4$, LiCl, LiBr, $CH_3SO_3Li$, $CF_3SO_3Li$, or cesium carbonate. In order to further improve the adhesiveness to a current collector, the positive electrode mixture and/or the negative electrode mixture of the invention may also contain any of acrylic resins such as polymethacrylate and polymethyl methacrylate, and polyimide, polyamide, and polyamide-imide resins.

A separator may be disposed between the positive electrode and the negative electrode. The separator may be a conventionally known one, or may be a separator coated with the aforementioned binder of the invention.

Use of the aforementioned binder of the invention for at least one selected from the positive electrode, the negative electrode, and the separator of the secondary battery (preferably, lithium ion secondary battery) is also preferred.

A film for a secondary battery formed from the aforementioned binder of the invention is also a preferred aspect of the invention.

A laminate for a secondary battery including a substrate and a layer formed from the aforementioned binder of the invention on the substrate is also a preferred aspect of the invention. Examples of the substrate include those mentioned as examples of the current collector and known substrates for separators of secondary batteries (e.g., porous films).

EXAMPLES

The invention is described with reference to examples, but the invention is not intended to be limited by these examples.

Polymerization Example 1 (Production of Fluorine-Containing Polymer (a))

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of TFE/VdF=5/95 (ratio by mole) was put into the autoclave, so that the pressure inside the container was adjusted to 1.5 MPa. Then, 0.20 g of 3-butenoic acid and 0.5 g of a 50% by mass methanol solution of di-n-propyl peroxydicarbonate were added, whereby polymerization was initiated. A gas mixture of TFE/VdF=10/90 (ratio by mole) was added so as to maintain the pressure inside the container, and 70 g in total of the gas mixture was fed before completion of the reaction. In response to the feeding of gas mixture, 3-butanoic acid was continuously added, and 0.54 g in total thereof was added before completion of the reaction. Completion of feeding 70 g of the gas mixture was followed by release of the gas inside the container, whereby the reaction was completed.

The reaction product was washed with water and dried, whereby 69 g of a fluorine-containing polymer (a) was obtained.

The composition and physical properties of the resulting fluorine-containing polymer (a) are as follows.

Fluorine-containing polymer (a): TFE/VdF=14/86 (mol %), 3-butenoic acid: 0.39 (mol %), weight average molecular weight: 1260000

The following fluorine-containing polymers (b) to (e) were produced basically in the same manner as in Polymerization Example 1, except that the ratio of TFE and VdF added was changed and that 3-butenoic acid was changed to 4-pentenoic acid.

Fluorine-containing polymer (b): TFE/VdF=33/67 (mol %), 3-butenoic acid: 0.70 (mol %), weight average molecular weight: 1160000

Fluorine-containing polymer (c): TFE/VdF=18/82 (mol %), 4-pentenoic acid: 0.45 (mol %), weight average molecular weight: 820000

Fluorine-containing polymer (d): TFE/VdF=32/68 (mol %), 4-pentenoic acid: 0.70 (mol %), weight average molecular weight: 930000

Fluorine-containing polymer (e): TFE/VdF=19/81 (mol %), weight average molecular weight: 980000

Polymerization Example 2 (Production of Fluorine-Containing Polymer (f))

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of tetrafluoroethylene/vinylidene fluoride=4/96 (ratio by mole) was put into the autoclave, so that the pressure inside the container was adjusted to 1.5 MPa. Then 0.14 g of 4-pentenoic acid and 0.2 g of a 50% by mass methanol solution of di-n-propyl peroxydicarbonate were added, whereby polymerization was initiated. A gas mixture of tetrafluoroethylene/vinylidene fluoride=11/89 (ratio by mole) was added so as to maintain the pressure inside the container, and 70 g in total of the gas mixture was fed before completion of the reaction. In response to the feeding of gas mixture, 4-pentenoic acid was continuously added, and 0.62 g in total thereof was added before completion of the reaction. Completion of feeding 70 g of the gas mixture was followed by release of the gas inside the container, whereby the reaction was completed.

The reaction product was washed with water and dried, whereby 68 g of a fluorine-containing polymer (f) was obtained.

The composition and physical properties of the resulting fluorine-containing polymer (f) are as follows.

Fluorine-containing polymer (f): TFE/VDF=13/87 (mol %), 4-pentenoic acid: 0.61 (mol %), weight average molecular weight: 810000

Further, the following polymers were used in the examples and the comparative examples.

PVdF (A): homo PVdF, weight average molecular weight: 900000

PVdF (B): homo PVdF, weight average molecular weight: 1800000

PVdF (C): acryl-modified PVdF, weight average molecular weight: 1100000, amount of modification: 1.0 mol %

PVdF (D): maleic acid-modified PVdF, weight average molecular weight: 900000, amount of modification: 0.5 mol %

PVdF (E): CTFE-modified PVdF, weight average molecular weight: 800000, amount of modification: 2.4 mol %

Examples 1 to 12 and Comparative Examples 1 to 4

With the fluorine-containing polymers and the PVdFs as shown in Table 1, the physical properties were determined and evaluated by the following methods. The results are shown in Table 1.

(Polymer Composition 1)

The ratio between VdF and TFE was determined by $^{19}$F-NMR measurement using a NMR analyzer (VNS400 MHz, available from Agilent Technologies Inc.) and the polymer in the state of a DMF-$d_7$ solution.

The following peak areas (A, B, C, and D) were determined by $^{19}$F-NMR measurement, and the proportions of VdF and TFE were calculated.

A: peak area from −86 ppm to −98 ppm
B: peak area from −105 ppm to −118 ppm
C: peak area from −119 ppm to −122 ppm
D: peak area from −122 ppm to −126 ppm Proportion of VdF: $X_{VdF}=(4A+2B)/(4A+3B+2C+2D)\times100$(mol %)

Proportion of TFE: $X_{TFE}=(B+2C+2D)/(4A+3B+2C+2D)\times100$(mol %)

The amount of 3-butenoic acid or 4-pentenoic acid was measured by acid-base titration of carboxy groups. The procedure is described in detail below.

About 0.5 g of the fluorine-containing polymer was dissolved in 15 g of acetone at 70° C. to 80° C. Then, 5 ml of water was added thereto such that the polymer did not coagulate. Titration with 0.1 N aqueous NaOH was performed until the acidity was completely neutralized, with neutrality transition at about −270 mV. In accordance with the measurement results, the amount of substance a (mol/g) of 3-butenoic acid or 4-pentenoic acid contained in 1 g of the fluorine-containing polymer was calculated. Based on the amount of substance a, the VdF/TFE composition of the fluorine-containing polymer calculated by the aforementioned method, and the molecular weights of TFE, VdF, and 3-butenoic acid or 4-pentenoic acid, the proportion Y (mol %) of 3-butenoic acid or 4-pentenoic acid of the fluorine-containing polymer was determined such that the following formula is satisfied.

$$\alpha = Y/[\{\text{molecular weight of } TFE\} \times \{X_{TFE} \times (100-Y)/100\} + \{\text{molecular weight of } VdF\} \times \{X_{VdF} \times (100-Y)/100\} + \{\text{molecular weight of 3-butenoic acid or 4-pentenoic acid}\} \times Y]$$

Based on the resulting values $X_{VdF}$, $X_{TFE}$, and Y, the final compositional proportions were calculated as follows.

Proportion of $VdF$: $X_{VdF} \times (100-Y)/100$ (mol %)

Proportion of $TFE$: $X_{TFE} \times (100-Y)/100$ (mol %)

Proportion of 3-butenoic acid or 4-pentenoic acid: Y (mol %)

(Weight Average Molecular Weight)

The weight average molecular weight was determined by gel permeation chromatography (GPC). The weight average molecular weight was calculated from the data (reference: polystyrene) measured by flowing dimethyl formamide (DMF) serving as a solvent at a rate of 1.0 ml/min using AS-8010, CO-8020, and columns (three GMHHR-H columns connected in series) (each available from Tosoh Corp.), and RID-10A (Shimadzu Corp.).

Positive electrodes were produced as follows and the physical properties were determined and evaluated. The results are shown in Table 1.

(Preparation of Slurry for Positive Electrode Mixture)

A positive electrode active material (NMC (622) ($LiNi_{0.6}Mn_{0.2}Co_{0.2}O_2$)), acetylene black (AB) serving as a conductive agent, and the binder (fluorine-containing polymer and PVdF) were weighed in a mass ratio shown in Table 1. The fluorine-containing polymer and the PVdF were dissolved in N-methyl-2-pyrrolidone (NMP) such that the total concentration was 8% by mass. This NMP solution of the binder was sufficiently mixed with the predetermined amounts of the positive electrode active material and the conductive agent using a stirring device, ensuring good uniformity. The solids concentration of the slurry was adjusted to 70%.

(Production of Positive Electrode)

The resulting slurry for a positive electrode mixture was uniformly applied to an electrode current collector formed of aluminum foil having a thickness of 20 μm and NMP was completely evaporated, whereby a positive electrode was produced.

(Measurement of Electrode Critical Density of Positive Electrode)

The resulting electrode was repeatedly rolled at a pressure of 10 t using a roll press until no density change was observed. The density of the positive electrode mixture film at that time was defined as the electrode critical density. The density was calculated from the area, thickness, and weight measured.

(Evaluation of Electrode Flexibility (Bending Test on Positive Electrode))

The resulting electrode was rolled using a roll press until the density of the positive electrode mixture film reached a predetermined density of 3.3 g/cc. The resulting positive electrode was cut into a size of 3 cm in length and 6 cm in width, and the sample was folded 180° and unfolded. The positive electrode was visually checked for damage and cracking. The positive electrodes with no damage or cracking were evaluated as good, the positive electrodes with cracking were evaluated as acceptable, and the positive electrodes broken were evaluated as poor.

This evaluation was performed on the positive electrodes with the electrode densities shown in Table 1.

(Evaluation of Electrode Adhesiveness (Peeling Test on Positive Electrode))

A positive electrode piece having a length of 1.2 cm and a width of 7.0 cm was prepared, and the electrode side surface thereof was fixed on a movable jig with double-sided tape. The current collector was pulled 90° at a rate of 100 mm/min and the stress (N/cm) was measured using an autograph.

(Evaluation of Viscosity Retention (Slurry Dispersibility))

The viscosity of the slurry for a positive electrode mixture prepared above was measured at 25° C. using a B-type viscometer (TV-10M available from Toki Sangyo Co., Ltd.). The viscosity ($\eta 0$) in preparation of the slurry for a positive electrode mixture and the viscosity ($\eta a$) after 24 hours from the preparation of the slurry for a positive electrode mixture were measured, and the viscosity retention (Xa) was determined by the following formula. The mixture viscosity herein means the value of viscosity after 10 minutes from the start of rotation at a rate of 6 rpm using an M3 rotor.

$$Xa = \eta a/\eta 0 \times 100(\%)$$

(Preparation of Slurry for Positive Electrode Mixture Containing Nickel-Rich Active Material)

A positive electrode active material NCA ($LiNi_{0.82}Co_{0.15}Al_{0.03}O_2$), acetylene black (AB) serving as a conductive agent, and the binder (fluorine-containing polymer and PVdF) were weighed in a mass ratio (active material)/(AB)/(polymer) of 93/4/3. The fluorine-containing polymer and the PVdF were dissolved in N-methyl-2-pyrrolidone (NMP) such that the total concentration was 8% by mass. This NMP solution of the binder was sufficiently mixed with the predetermined amounts of the positive electrode active material and the conductive agent using a stirring device, ensuring good uniformity. The solids concentration of the composition was adjusted to 70%.

(Evaluation of Viscosity Retention (Gelling Test))

The slurry for a positive electrode mixture prepared above using NCA was subjected to measurement at 25° C. using a B-type viscometer (TV-10M available from Toki Sangyo Co., Ltd.). The viscosity ($\eta 0$) in preparation of the slurry for a positive electrode mixture and the viscosity ($\eta a$) after 24 hours from the preparation of the slurry for a positive electrode mixture were measured, and the viscosity retention (Xa) was determined by the following formula. The mixture viscosity herein means the value of viscosity after 10 minutes from the start of rotation at a rate of 6 rpm using an M3 rotor.

$$Xa = \eta a/\eta 0 \times 100(\%)$$

The slurries with a value of the above calculation of 300(%) or higher were evaluated as poor (gelatinized), while the slurries with a value of the above calculation of lower than 300(%) were evaluated as good.

TABLE 1

|  |  |  | Example 1 | Example 2 | Example 3 | Example 4 | Example 5 | Example 6 | Example 7 | Example 8 |
|---|---|---|---|---|---|---|---|---|---|---|
| Binder | PVdF | A | 70 | 80 | 65 | 80 |  |  |  |  |
|  |  | B |  |  |  |  | 85 |  |  |  |
|  |  | C |  |  |  |  |  | 80 |  |  |
|  |  | D |  |  |  |  |  |  | 75 |  |
|  |  | E |  |  |  |  |  |  |  | 70 |
|  | Fluorine-containing polymer | a | 30 |  |  |  |  |  |  |  |
|  |  | b |  | 20 |  |  |  |  |  |  |
|  |  | c |  |  | 35 |  |  |  |  |  |
|  |  | d |  |  |  | 20 | 15 | 20 | 25 | 30 |
|  |  | e |  |  |  |  |  |  |  |  |
|  |  | f |  |  |  |  |  |  |  |  |
| Gelling test (24 hrs from preparation of slurry) *active material: NCA |  |  | Good | Good | Good | Good | Good | Good | Good | Good |
| Slurry dispersibility A: 100-80% B: 79-70% C: 69% or lower |  |  | A | A | A | A | A | A | A | A |
| Peeling test (N/cm) |  |  | 0.34 | 0.32 | 0.35 | 0.32 | 0.38 | 0.5 | 0.31 | 0.3 |
| Electrode critical density A: 3.6 g/cc or higher B: 3.4 g/cc or higher C: lower than 3.4 g/cc |  |  | A | A | A | A | A | A | A | A |
| Electrode flexibility (3.3 g/cc) |  |  | Good | Good | Good | Good | Good | Good | Good | Good |

|  |  |  | Example 9 | Example 10 | Example 11 | Example 12 | Comparative Example 1 | Comparative Example 2 | Comparative Example 3 | Comparative Example 4 |
|---|---|---|---|---|---|---|---|---|---|---|
| Binder | PVdF | A | 35 |  | 75 | 100 |  | 80 | 80 |  |
|  |  | B |  |  |  |  |  |  |  |  |
|  |  | C |  | 13 |  |  | 100 |  |  |  |
|  |  | D |  |  | 93 |  |  |  |  | 20 |
|  |  | E |  |  |  |  |  |  |  |  |
|  | Fluorine-containing polymer | a |  |  |  |  |  |  |  |  |
|  |  | b |  | 87 | 7 |  |  |  |  |  |
|  |  | c |  |  |  |  |  |  |  |  |
|  |  | d | 65 |  |  |  |  |  |  |  |
|  |  | e |  |  |  |  |  | 20 |  |  |
|  |  | f |  |  |  | 25 |  |  |  |  |
| Gelling test (24 hrs from preparation of slurry) *active material: NCA |  |  | Good | Good | Good | Good | Poor | Poor | Good | Poor |
| Slurry dispersibility A: 100-80% B: 79-70% C: 69% or lower |  |  | A | B | A | A | A | A | A | A |
| Peeling test (N/cm) |  |  | 0.43 | 0.49 | 0.29 | 0.32 | 0.19 | 0.49 | 0.14 | 0.23 |
| Electrode critical density A: 3.6 g/cc or higher B: 3.4 g/cc or higher C: lower than 3.4 g/cc |  |  | A | A | B | A | C | C | A | C |
| Electrode flexibility (3.3 g/cc) |  |  | Good | Good | Good | Good | Poor | Poor | Good | Poor |

The invention claimed is:

1. A binder for a secondary battery, comprising
a fluorine-containing polymer (A); and
polyvinylidene fluoride (B),
the fluorine-containing polymer (A) containing:
a polymerized unit based on vinylidene fluoride;
a polymerized unit based on tetrafluoroethylene; and
a polymerized unit based on a monomer (2-2) represented by the following formula (2-2):

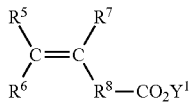

(2-2)

wherein $R^5$, $R^6$, and $R^7$ are each independently a hydrogen atom or a C1-C8 hydrocarbon group; $R^8$ is a C1-C8 hydrocarbon group; and $Y^1$ is H or $NH_4$.

2. The binder for a secondary battery according to claim 1,
wherein the fluorine-containing polymer (A) and the polyvinylidene fluoride (B) give a mass ratio (A)/(B) of 5/95 to 95/5.

3. The binder for a secondary battery according to claim 1,
wherein in the fluorine-containing polymer (A), the polymerized unit based on vinylidene fluoride is present in an amount of 50 to 95 mol %, the polymerized unit based on tetrafluoroethylene is present in an amount of 4.8 to 49.95 mol %, and the polymerized unit based on the monomer (2-2) is present in an amount of 0.05 to 2.0 mol %, relative to all polymerized units.

4. The binder for a secondary battery according to claim 1,
wherein the fluorine-containing polymer (A) has a weight average molecular weight of 200000 to 2400000.

5. The binder for a secondary battery according to claim 1,
wherein the fluorine-containing polymer (A) has a storage elastic modulus of 1000 MPa or lower at 25° C.

6. The binder for a secondary battery according to claim 1,
wherein the fluorine-containing polymer (A) has a storage elastic modulus of 800 MPa or lower at 25° C.

7. An electrode mixture for a secondary battery, comprising a mixture that contains at least:
the binder for a secondary battery according to claim 1;
a powdery electrode material for a battery; and
water or a nonaqueous solvent.

8. An electrode for a secondary battery, comprising the binder for a secondary battery according to claim 1.

9. A secondary battery comprising the electrode for a secondary battery according to claim 8.

10. The binder for a secondary battery according to claim 1, wherein $R^8$ is a C1-C4 hydrocarbon group.

11. The binder for a secondary battery according to claim 1, wherein the polymerized unit based on vinylidene fluoride is included in an amount of 50-95 mol % of the total polymerization units of the fluorine-containing polymer (A).

12. The binder for a secondary battery according to claim 1, wherein $R^8$ is a C1-C4 hydrocarbon group, and the polymerized unit based on vinylidene fluoride is included in an amount of 50-95 mol % of the total polymerization units of the fluorine-containing polymer (A).

* * * * *